United States Patent [19]

Younglove

[11] Patent Number: 5,059,772
[45] Date of Patent: Oct. 22, 1991

[54] READING METHOD AND APPARATUS FOR CARTRIDGE LIBRARY

[75] Inventor: Bruce Younglove, Boulder, Colo.

[73] Assignee: Exabyte Corporation, Boulder, Colo.

[21] Appl. No.: 434,099

[22] Filed: Nov. 9, 1989

[51] Int. Cl.$^5$ .......................................... G06K 15/00
[52] U.S. Cl. .................................. 235/383; 235/462; 360/92
[58] Field of Search ............... 235/375, 383, 462, 472; 360/92

[56] References Cited

U.S. PATENT DOCUMENTS

| | | | |
|---|---|---|---|
| 4,271,440 | 6/1981 | Jenkins et al. | 360/92 |
| 4,519,522 | 5/1985 | McElwee | 235/462 X |
| 4,608,679 | 8/1986 | Rudy et al. | 369/34 |
| 4,636,634 | 1/1987 | Harper et al. | 235/462 X |
| 4,675,856 | 6/1987 | Rudy et al. | 369/34 |
| 4,685,095 | 9/1987 | Rudy et al. | 369/92 |
| 4,731,682 | 3/1988 | Nishiyama et al. | 360/92 |
| 4,742,504 | 5/1988 | Takasuka et al. | 369/34 |
| 4,802,035 | 1/1989 | Ohtsuka | 360/92 |
| 4,812,629 | 3/1989 | O'Neil et al. | 235/383 |
| 4,814,592 | 3/1989 | Bradt et al. | 235/383 X |
| 4,815,055 | 3/1989 | Fago, Jr. | 369/36 |
| 4,815,056 | 3/1989 | Toi et al. | 369/30 |
| 4,817,070 | 3/1989 | Hug et al. | 369/36 |
| 4,860,133 | 8/1989 | Baranski | 360/92 |
| 4,972,277 | 11/1990 | Sills et al. | 360/92 |
| 4,984,106 | 1/1991 | Herger et al. | 360/92 |

FOREIGN PATENT DOCUMENTS 56-19551 3/1981 Japan .
63-237256 3/1988 Japan .

OTHER PUBLICATIONS

"Von der Vision Zur Realisation", ABBA–das Rabotersystem fur 3480—Kassetten, Grau, Mar. 1988.
"Automation: Freedom of Information Management", 4400 Automated Cartridge System, Storage Technology Corporation, 1987.
"Performance for Today. A Foundation for Tomorrow", 4480 Cartridge System, Storage Technology Corporation, 1987.
"The Future of Strategic Information Management is at Hand, Nearline TM Storage and Retrieval", Storage Technology Corporation, Jan. 1987.

Primary Examiner—David Trafton
Attorney, Agent, or Firm—Griffin, Branigan & Butler

[57] ABSTRACT

An automated magnetic tape catridge library system houses a plurality of tape drives (56A–56E) and a plurality of racks (70) wherein magnetic tape cartridges are stored. A cartridge transport assembly (100) serves to retrieve a cartridge from a cartridge cell (826) of a rack (70) and to load the cartridge into a target tape drive (56), and vice versa. The cartridge transport assembly (100) includes a pair of engagement fingers (402A, 402B) which engage a selected cartridge upon contact with the cartridge, and a biased plunger (438). The plunger (438) has a bar code reader (446) internally mounted therein for reading bar code indicia on the cartridges and for detecting tracking indicia (868) provided on projections (866) of the cartridge racks (70). A method for library inventory, necessitated by possible manual removal or insertion of cartridges after opening of a library door (26), is also provided. A library map has stored therein cartridge label bar code values and the precise X, Y, and Z coordinates for each cartridge in the library system.

43 Claims, 24 Drawing Sheets

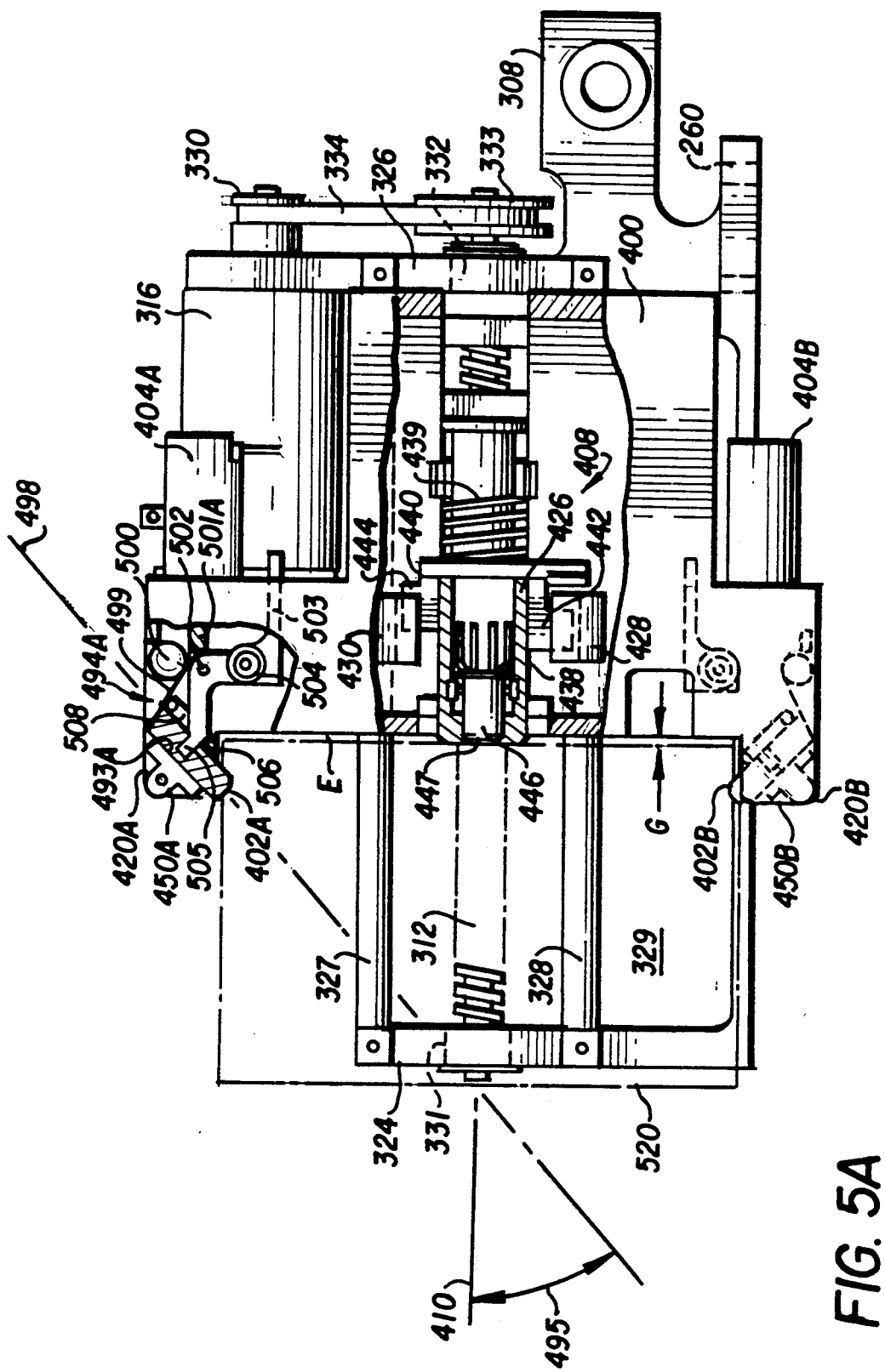

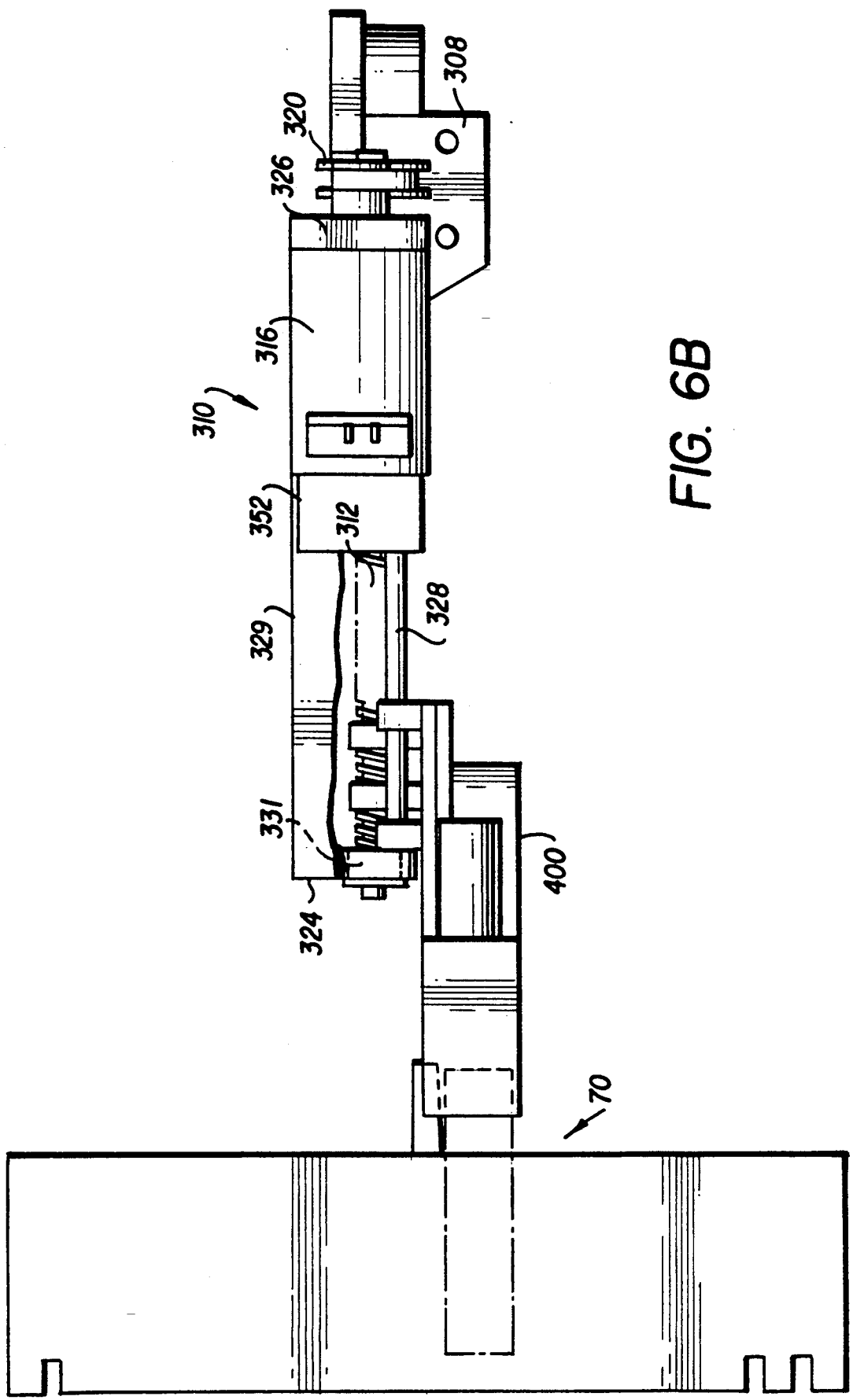

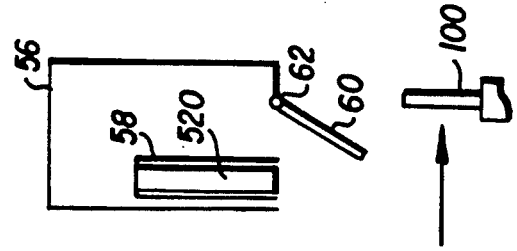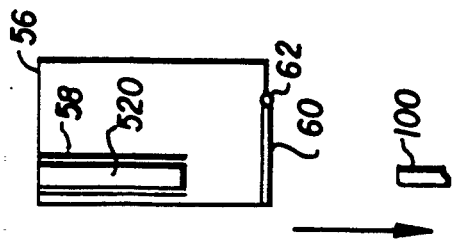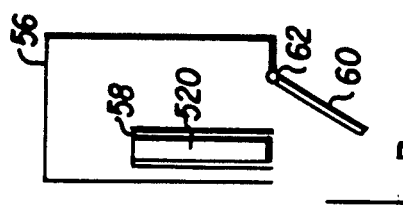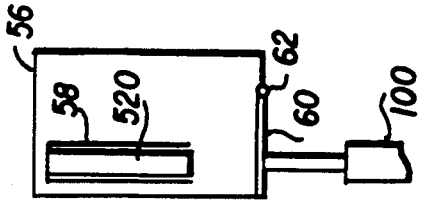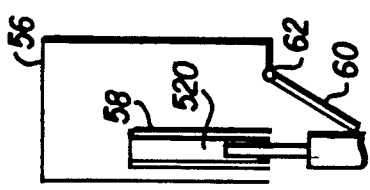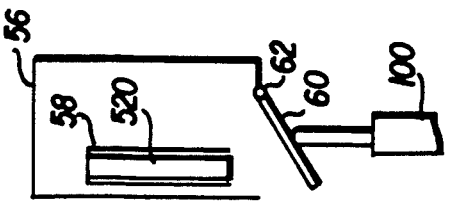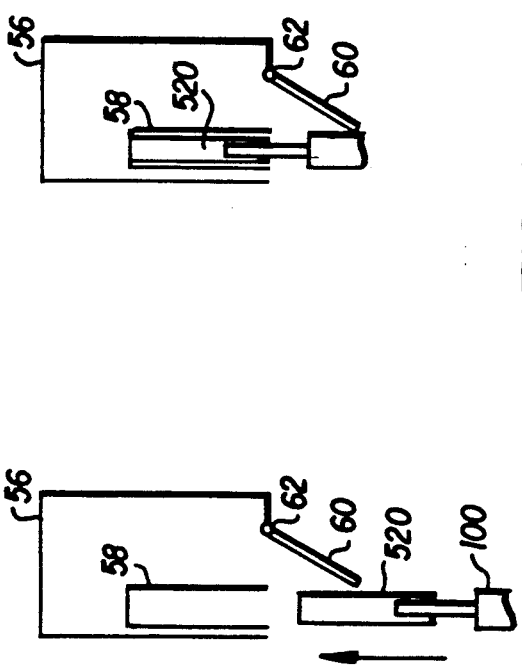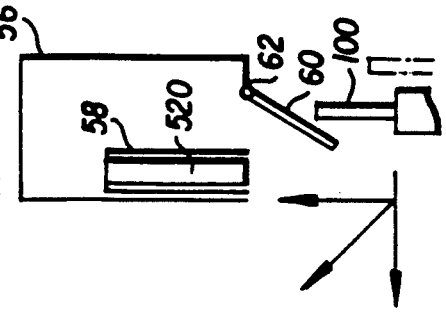

READING METHOD AND APPARATUS FOR CARTRIDGE LIBRARY

BACKGROUND

1. Field of Invention

This invention relates to method and apparatus for the storage, retrieval, and loading of units of data storage medium, and particularly to method and apparatus for the storage, retrieval, and loading of cartridges of data storage medium, such as magnetic tape.

2. Prior Art and Other Considerations

Automated tape libraries were developed to expedite the selection and loading of magnetic tape reels. One such type of automated tape library resembles an elongate rectangular chamber. Racks of tape reels are provided at selected locations along the interiors of the opposing elongated walls. An interior track runs the length of the chamber between the parallel racks. A reel retrieval/loading device is mounted on a carriage that travels along the track, and is translatable along two rectangular axes in addition to the third axis of the track. The retrieval/loading device is automatically controlled to locate and engage a selected reel in a Cartesian coordinate system, and then transports the selected reel to a target on one of a plurality of tape drives. The tape drives are located along the exterior wall of the chamber at windows provided for access to the drives. The retrieval/loading device automatically mounts the selected reel on the target tape drive.

Another prior art configuration for a storage library features a cylindrical chamber, with storage racks provided along the interior of the circular wall and a plurality of peripheral devices located along the exterior at windows. The retrieval/loading device is positioned in the center of the room, is operated in a cylindrical coordinate fashion.

Magnetic tape cartridges have recently become popular as a unit of storage medium, particularly 8 mm magnetic tape cartridges (as used herein, the term "cartridge" also refers to magnetic tape cassettes). Advantageously, magnetic tape cartridges facilitate economic and compact storage of data.

Copending U.S. Pat. Nos. 4,984,106 and 4,972,277, respectively entitled CARTRIDGE LIBRARY SYSTEM AND METHOD OF OPERATION THEREOF and CARTRIDGE TRANSPORT ASSEMBLY AND METHOD OF OPERATION THEREOF, both filed on 10 Nov. 1989 and commonly assigned herewith, are incorporated herein by reference as disclosing a library system for handling magnetic tape cartridges. The automated magnetic tape cartridge library system of these patent applications includes a cabinet housing a plurality of tape drives and a plurality of racks wherein magnetic tape cartridges are stored. A cartridge transport assembly serves to retrieve a cartridge from a rack and to load the cartridge into a target tape drive. Movement of the cartridge transport assembly along X, Y, and Z rectangular coordinates axes is effected by X, Y, Z and displacement systems.

The cartridge transport assembly described above includes a pair of engagement fingers which engage a selected cartridge upon contact with the cartridge. In an engagement mode, engagement fingers are configured and oriented to engage changer grip notches provided on opposite edges of a standard 8 mm magnetic tape cartridge such that, upon engagement, the cartridge is locked between the fingers without the need of further locking mechanisms.

The cartridge transport assembly described above also includes means for detecting when a cartridge is positioned to be loaded (either into a target drive or into a storage rack). In particular, when a cartridge is positioned for loading, abutment of the cartridge with the drive or rack forces the cartridge flush against the cartridge transport assembly and depresses a plunger of the cartridge transport assembly. When depression of the plunger is detected, a solenoid carried on the cartridge transport assembly operates via linkage means to retract the engagement fingers out of the cartridge changer grip notches. The cartridge is thus released or loaded into the awaiting target drive or target rack.

Portions of the linkage means of the cartridge transport assembly dually function as ram elements for closing a tape drive door once a cartridge is loaded into a target tape drive. In this regard, after a cartridge is loaded into a target drive, the cartridge transport assembly retreats from the target drive is displaced to a side thereof. The cartridge transport assembly is then moved with respect to the X and Z axes to provide the ram elements with components of motion suitable for closing the pivotal door of the tape drive.

While other types of automated libraries have utilized reading or scanning devices such as bar code readers to read indicia on the tapes or discs stored in the library, a suitable indicia system has heretofore not been to be realized for the library system for handling magnetic tape cartridges described in the preceding paragraphs.

Moreover, whenever a door of an automated library system is opened, there is a possibility that one or more devices stored in the library may have been manually removed or placed in another location in the library. Alternatively, there is the possibility that additional devices may have been introduced into the library. In either event, the library must somehow again inventory itself lest incorrect tapes or cartridges be retrieved and read during subsequent operations.

Accordingly, it is an object of the present invention to provide a cartridge library system and method of operation thereof having reading capabilities.

An advantage of the present invention is the provision of strategically located reader apparatus for reading indicia on cartridges stored in an automated cartridge library.

Another advantage of the present invention is the provision of method and apparatus for taking inventory of a cartridge library system.

A further advantage of the present invention is the provision of a cartridge library system including cartridge racks that have detectable indicia strategically located thereon.

SUMMARY

An automated magnetic tape cartridge library system houses a plurality of tape drives and a plurality of racks wherein magnetic tape cartridges are stored. A cartridge transport assembly serves to retrieve a cartridge from a cell in a rack and to load the cartridge into a target tape drive, and vice versa. Alternatively, the cartridge transport assembly transports a cartridge between cells of the racks.

The cartridge transport assembly includes a pair of engagement fingers which engage a selected cartridge upon contact with the cartridge, and a biased plunger. The plunger has a bar code reader internally mounted therein for reading bar code indicia on the cartridges and for detecting tracking indicia provided on projections of the cartridge racks.

The cartridge rack includes ribs for partitioning the rack into cells for accommodating magnetic tape cartridges. A pair of resilient engagement fingers is provided in each cell. Each engagement finger has a chevron-shaped projection formed thereon. The resilient engagement fingers are sized and situated so that the chevron-shaped projections engage light path windows provided on a lid of a standard 8 mm. magnetic tape cartridge. Engagement by the chevron-shaped projections permit the rack to be carried or mounted in any orientation without the cartridges falling out of the rack.

The ribs of the rack also have a cartridge engagement ridge thereon which engages a lid gap of a standard 8 mm magnetic tape cartridge when the cartridge is inserted in a required orientation into a cell of the rack. The cartridge engagement ridge precludes a cartridge from being inserted into a cell in any but the required orientation.

In addition to having cell-defining ribs, the cartridge rack has a bridging member which also serves a cell partitioning function. The bridging member has a projection mounted thereon which bears a detectable indicia, such as reflective indicia detectable by a reader device such as a bar code scanner.

The rack of the invention has resilient engagement tabs for mounting the rack on an extrusion mount. The extrusion mount serves to mount one or more of the racks of the invention to a wall surface, such as a vertical wall included in a cartridge library. Orientation means are provided on a bottom wall of the rack to preclude the rack from being mounted on the extrusion mount in any but a desired orientation.

The cartridge library system has a door which can be manually opened. After each opening and closing of the library door, a library computer again inventories the library and accordingly updates a data look-up table stored in the computer's memory. This look-up table, also known as the library map, has four values stored therein for each of 110 potential cartridges in the eleven cartridge racks and for each of six potential cartridges in the fixed cartridge locations. These values include a value indicative of a bar code value appearing on a label of the cartridge, and the X, Y, and Z coordinates of the cartridge. In addition, since the library is reconfigurable to include a greater or lesser number of drives, the library computer determines how many drives are currently included in the library.

In connection with the inventory procedure, the library computer causes the cartridge transport assembly to travel to the suspected location of each cartridge rack and to physically contact the rack to verify that the rack is present. For racks determined to be present in the cartridge library, the computer directs the bar code reader positioned in the plunger to locate the four edges of the square projection which surmounts the rack and which carries reflective indicia. After locating the coordinates of the cartridge index projection edges, the library computer calculates the precise center of the cartridge rack and the precise coordinates of the cells in the rack.

Knowing the precise coordinates of the cells within the rack, the library computer directs the cartridge transport assembly to determine by physical contact whether a cartridge is in each cell. If a cartridge is located in a cell, the library computer further directs the bar code reader to determine whether the cartridge bears a bar code. If a bar code is detected for a cartridge, a value indicative of the bar code is stored in the memory map for the cartridge. The presence of cartridges in fixed location cartridge holders and the bar codes borne by such cartridges are determined in similar manner.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5A is a side view, partially sectioned, of a cartridge transport assembly and a Z-carriage of the cartridge library system of the embodiment of FIG. 1, with the cartridge transport assembly shown in a retracted position.

FIG. 6B is a top view, partially sectioned, of a cartridge transport assembly and a Z-carriage of the cartridge library system of the embodiment of FIG. 1, together with a rack for storing a plurality of cartridges, with the cartridge transport assembly shown in an extended position engaging a cartridge in a rack.

FIGS. 18A-18H are schematic views showing sequential steps involved with the release of a cartridge from a cartridge transport assembly and the closing of a tape drive door by the cartridge transport assembly.

DETAILED DESCRIPTION OF THE DRAWINGS

Figure 1:
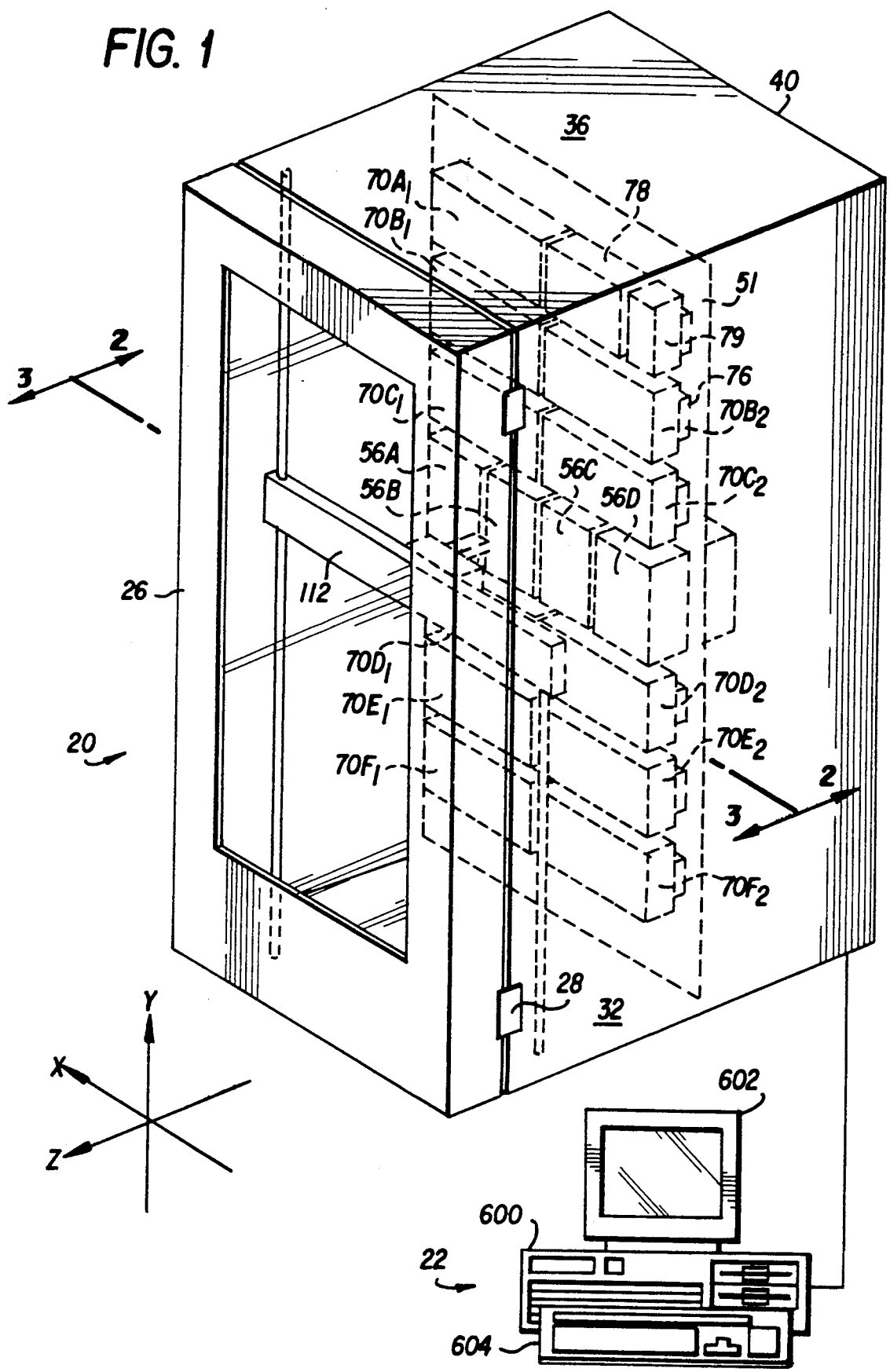
FIG. 1 is an isometric view of a cartridge library system according to an embodiment of the invention.

The cartridge library system of FIG. 1 includes both a library system frame 20 and a library controller ("LC") computer system 22. The library system frame 20 has a rectangular cabinet 24 and a door 26. The door 26 has transparent glass 27 mounted therein (see FIG. 3). The door 26 is pivotally connected, as by hinges 28 for example, along a front corner of the cabinet 24, so that door 26 pivots about axis 30 proximate that front corner. The cabinet 24 is comprised of a plurality of planar cabinet panels, including a right side panel 32; a left side panel 34; a top panel 36; a bottom panel 38; and, a rear panel 40.

FIG. 1 further shows three dimensional axes, in particular as X axis, a Y axis, and a Z axis. From the foregoing and the FIG. 1 illustration of these axes, it should be understood that each of the aforedescribed cabinet panels each have exterior surfaces which lie in planes described with reference to these axes. For example, cabinet right side panel 32 has an exterior surface which lies in a XZ plane; cabinet top panel 36 has an exterior surface which lies in a XY plane. Thus, it should also be understood that the axis 30, about which door 26 pivots, is parallel to the Y axis.

STRUCTURE: CABINET

The library system cabinet 24 also includes a vertically erect wall 51 mounted on the cabinet bottom panel 38. Wall 51 has six rows 52A-52F of racks provided on a front face thereof.

Figure 2:
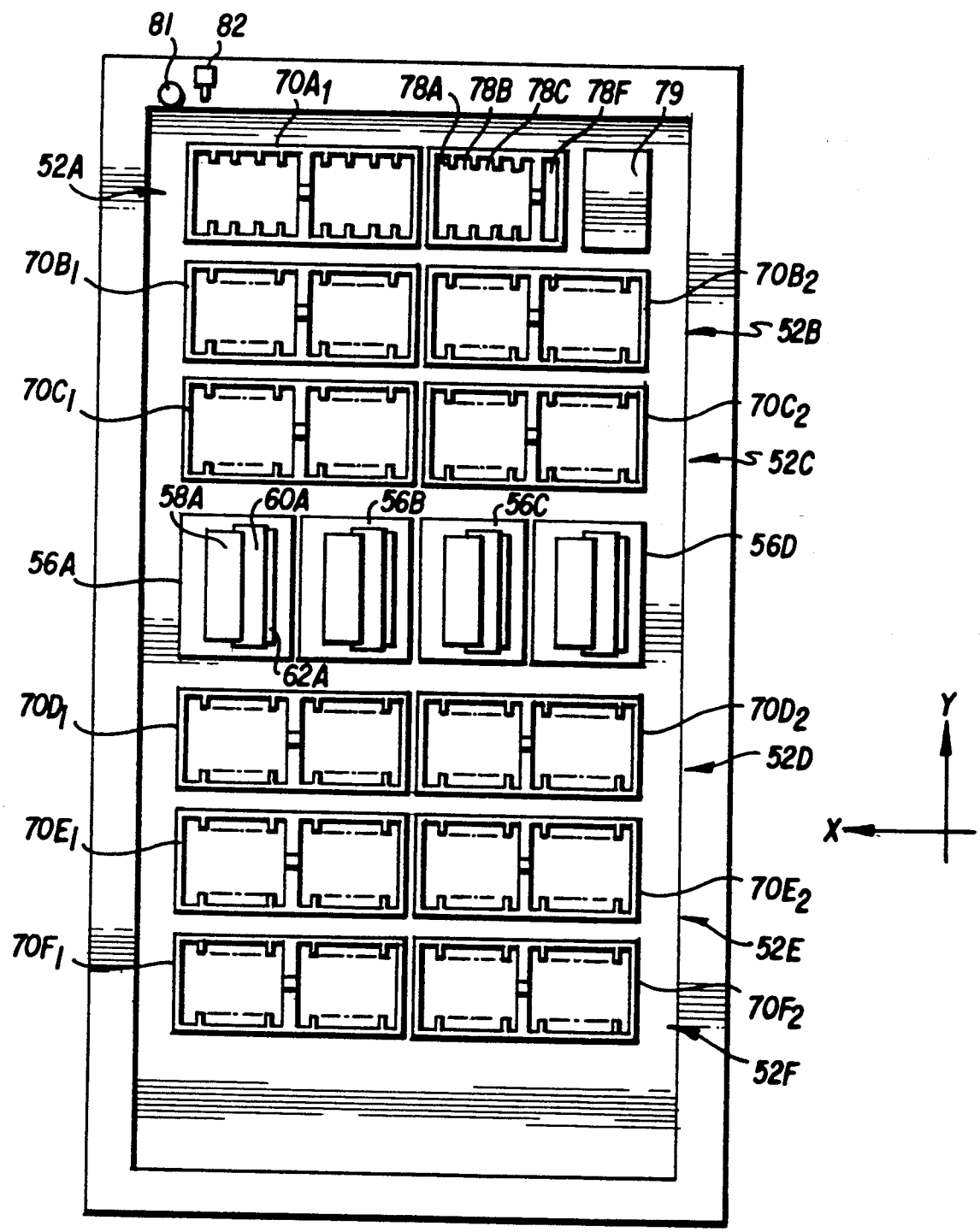
FIG. 2 is a front view, taken along line 2—2, of a cabinet of the cartridge library system of the embodiment of FIG. 1.

As shown in FIG. 2, the wall 51 has a plurality of tape drives mounted thereon, particularly four tape drives 56A-56D. Although four drives 56 are shown in the illustrated embodiment, the number of drives 56 can vary from one to four, depending upon the requirements of the user. Each tape drive has a cartridge cell 58 and a drive door 60, with the drive door 60 being pivotal about a hinge axis 62. In the preferred embodiment, the drives 56 are those marketed by Exabyte Corporation as model number Exabyte 8200. The drives 56 are contiguously arranged along the X axis. The drives 56 are positioned at approximately half the height of the cabinet 24 in the sense of the Y axis, i.e. between the rows 52C and 52D. The front surfaces, and hence the cartridge cells 58 of each drive 56, are equidistant from the door front panel 50.

The cabinet wall 51 has mounted thereon a cartridge library wherein racks 70 magnetic tape cartridges 71 are storable. The structure of a cartridge rack 70 is discussed hereinafter in greater detail with reference to FIGS. 7-11. Each rack 70 accommodates ten cartridges 71. The racks 70 are positioned in the rows 52 mentioned above. Row 52A consists of one such cartridge rack $70A_1$; the remaining rows 52B-52F each consist of two racks 70. In this respect, row 52B consists of racks $70B_1$ and $70B_2$; row 52C consists of racks $70C_1$ and $70C_2$; and so forth.

In addition to the racks 70 described above, the cartridge library includes six fixed position cartridge holders 78A-78F mounted on the wall 51 just to the right of the highest row 52A of racks 70 (as seen in FIGS. 1 and 2). To the right of the sixth fixed position cartridge holder 78F is a cartridge holder 79 aligned with a cartridge entry/exit port 80 provided on the door 26 of the library system 20.

Figure 11B:
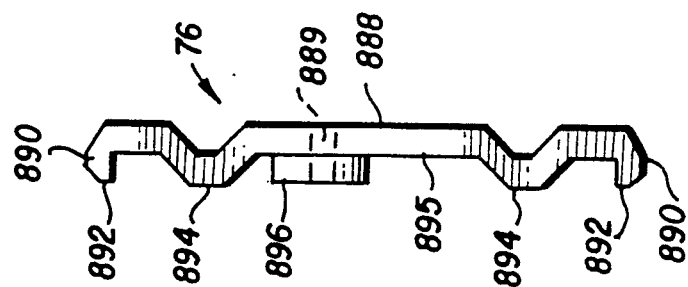
FIG. 11B is a side view of a portion of a rack mount for the cartridge library system of the embodiment of FIG. 1.
Figure 11A:
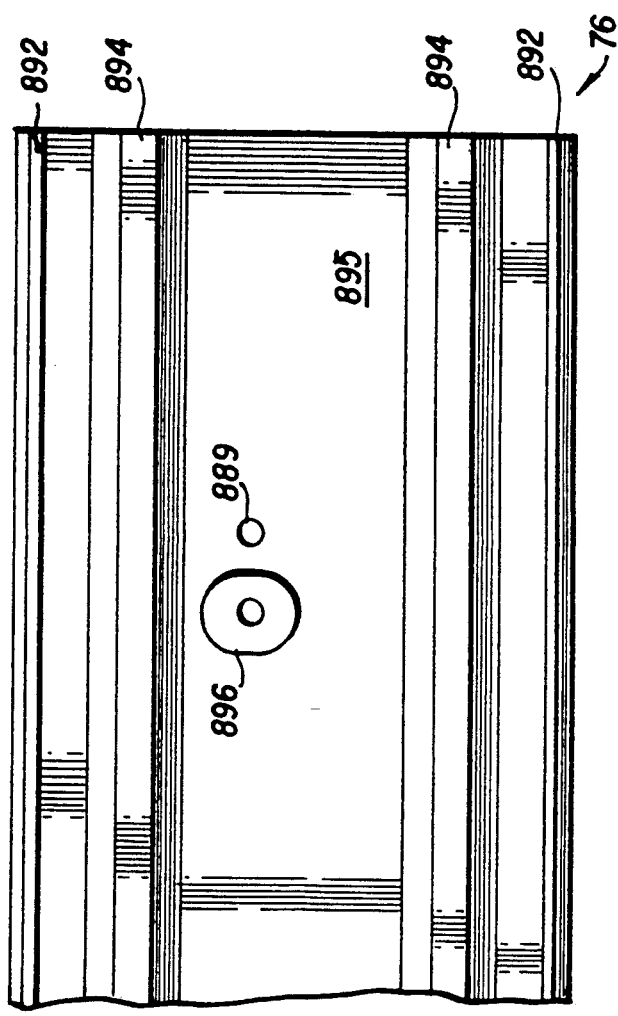
FIG. 11A is a front view of a portion of a rack mount for the cartridge library system of the embodiment of FIG. 1.

The cartridge racks 70 in each row are removably mounted on an extrusion 76. The extrusion 76 is shown in FIGS. 11A and 11B.

Since each cartridge rack 70 stores 10 cartridges 71 therein, and since six fixed position cartridge holders 78A-78F are also provided, a maximum of 116 cartridges are also storable in the cartridge library 22 of the illustrated embodiment. The open face of each cartridge rack 70 and cartridge holder 78 faces the front of the cabinet 24, i.e., faces the door 26. It should be understood that in other embodiments the size of the cartridge library may vary to include either a greater or lesser number of cartridge racks (and hence a greater or lesser number of cartridges).

The front edge of the cabinet top wall 36 has a door close sensor 81 mounted thereon, which is a switch responsive to the closing of frame door 26. The cabinet top wall 36 is also provided with a door lock solenoid 82. When the door 26 is not to be opened, a plunger of the door lock solenoid 82 engages a corresponding bore 84 in the door 26.

A cartridge transport assembly 100 is mounted in the interior of the cabinet 24 near the door 26. The cartridge transport assembly 100 is displaceable along the X, Y, and Z axes by respective X, Y, and Z displacement systems 104, 106, and 108.

The Y displacement system 106 includes a Y direction displaceable carriage, also known as Y-carriage 112. The Y displacement system 106 further includes a Y-path guide rod 114 (hidden in FIG. 3); Y-drive belt assembly 116; a Y-drive motor 118; Y-path sensors 120, 121, and 122; and, Y-direction locking system 124.

The Y-path guide rod 114 is a vertically extending rod anchored to the door 26 on the interior of the door top panel 46 and the door bottom panel 48 near door right side panel 42. The Y-carriage 112 slides along the Y-path guide rod 114.

The Y-drive belt assembly 116 includes both right Y-belt 130R and left Y-belt 130L. The right Y-belt 130R is entrained about pulleys 132 and 134. The left Y-belt 130L is entrained about pulleys 136 and 138. Pulleys 132 and 136 are mounted on a common rotatable axle 140. Axle 140 is held aloft by bearing brackets 142L and 142R, which brackets are in turn supported by mounting strip 143. The axle 140 rotatably extends through bearings provided in the brackets 142. So positioned, pulley 132 is proximate the upper right corner of cabinet 24 (seen on the left when viewed from the rear as in FIG. 3) and pulley 136 is proximate the upper left corner of cabinet 24 (seen on the right when viewed from the rear as in FIG. 3).

Pulley 134 is rotatably mounted in bracket 146 and pulley 138 is rotatably mounted in bracket 144. Brackets 146 and 144 are mounted to the cabinet bottom panel 38 so that pulleys 134 and 138 are directly beneath pulleys 132 and 136, respectively, in the vertical (Y direction) sense. The pulleys 138 and 132 are is eccentrically mounted on their shaft to facilitate self-tightening of the left Y-belt 130Y.

Figure 3:
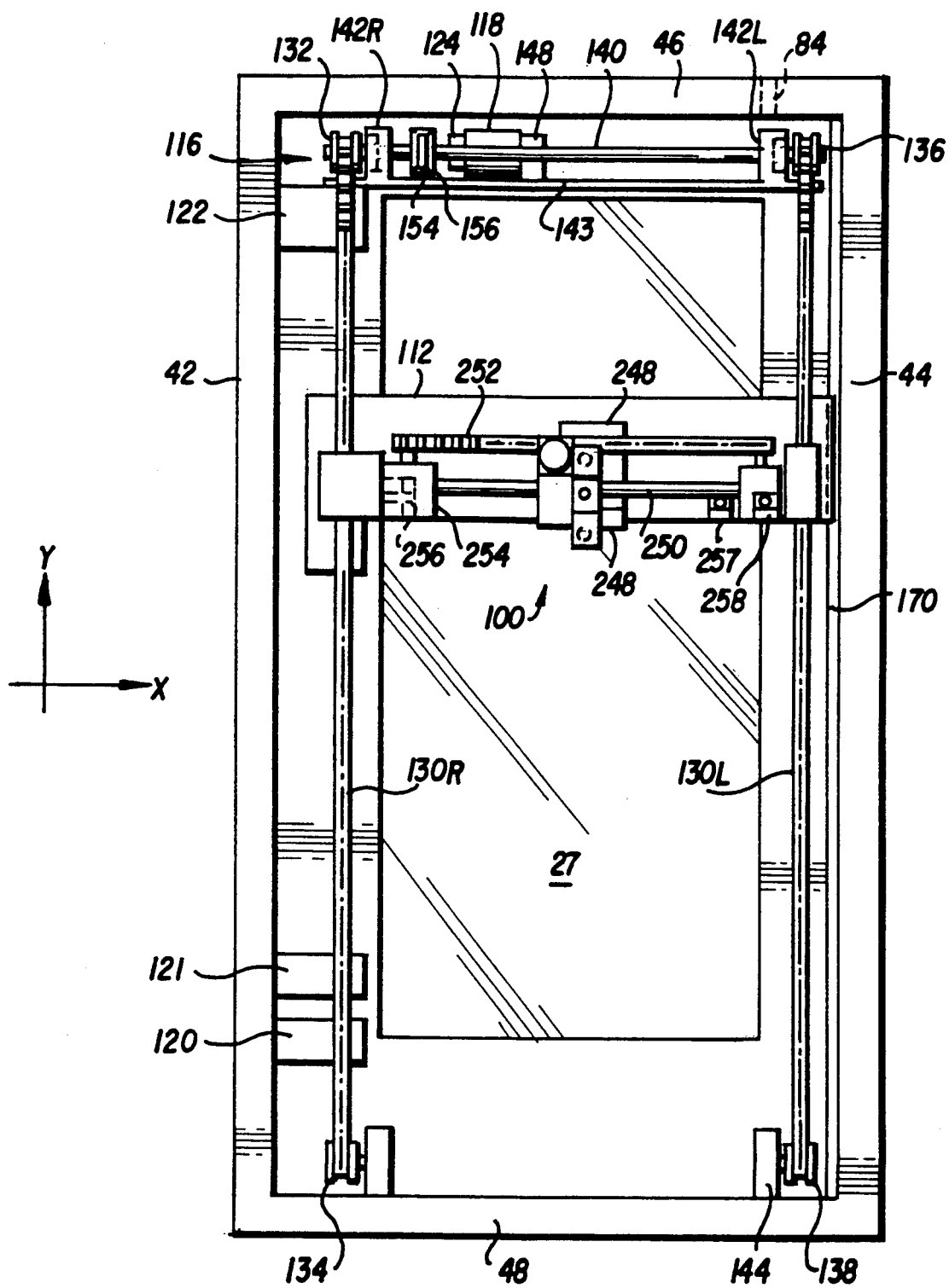
FIG. 3 is a rear view, taken along line 3—3, of a cabinet of the cartridge library system of the embodiment of FIG. 1.

The output shaft of Y-drive motor 118 has the Y-direction locking system 124 mounted thereon. The Y-direction locking system 124 is a solenoid brake which selectively arrests rotation of the output shaft of the Y-direct motor 118. The output shaft of the Y-drive motor 118 also has an unillustrated pulley secured thereto. This unillustrated pulley has a belt 154 entrained therearound. The belt 154 also entrains a pulley 156 which is mounted on the Y axle 40. In FIG. 3, the unillustrated pulley is directly behind the pulley 156. The Y-drive motor 118 includes a tachometer 148. The Y-drive motor 118 and the tachometer 148 are connected by unillustrated cables to the hereinafter-described circuitry of FIGS. 12A, 12B, and 12C.

The Y-carriage 112 carries an unillustrated metallic member positioned to break photocell beams included in the Y-lower limit sensor 120, the Y home sensor 121, and the Y-upper limit sensor 122. In this respect, a photocell beam 196 of Y-lower limit sensor 120 is directed just below its lowest permissible extent of Y-carriage 112 travel along the Y axis. Likewise, a similar photocell path of Y-sensor 122 is directed at the just above the highest permissible extent of travel of the Y-carriage 112 along the Y axis. The Y-home sensor 121 directs a photocell beam at a "home" position along the Y axis just above the Y-lower limit sensor 120.

As understood with reference to FIG. 3, the X displacement system 104 is primarily carried on the Y-carriage 112, and includes an X direction displaceable carriage, also known as X-carriage 248; X-path guide rod 250; and X-drive belt assembly 252; and X-drive motor 254; and, X-direction sensors 256, 257, and 258. The X-path guide rod 250 has opposing ends thereof anchored in opposing side walls of the Y-carriage 112. The X-drive motor 254 also includes a tachometer 274. The X-drive motor 254 and the tachometer 274 are connected by appropriate cables to circuitry described below in connection with FIGS. 12A, 12B, and 12C.

The X-carriage 248 has optical interrupt bracket mounted thereto which can interrupt photobeams associated respectively with the X-left limit sensor 256, the X-right limit sensor 258, and the X-home sensor 257. As seen in FIG. 2, the beam of the X-left limit sensor 256 is positioned just to the left of the leftmost permissible extent of travel of the X-carriage 248. The beam of the X-right limit sensor 258 is positioned just to the right of the rightmost permissible extent of travel of the X-carriage 248. The beam of the X-home sensor 257 is positioned just to the left of the X-right limit sensor 258.

Figure 4:
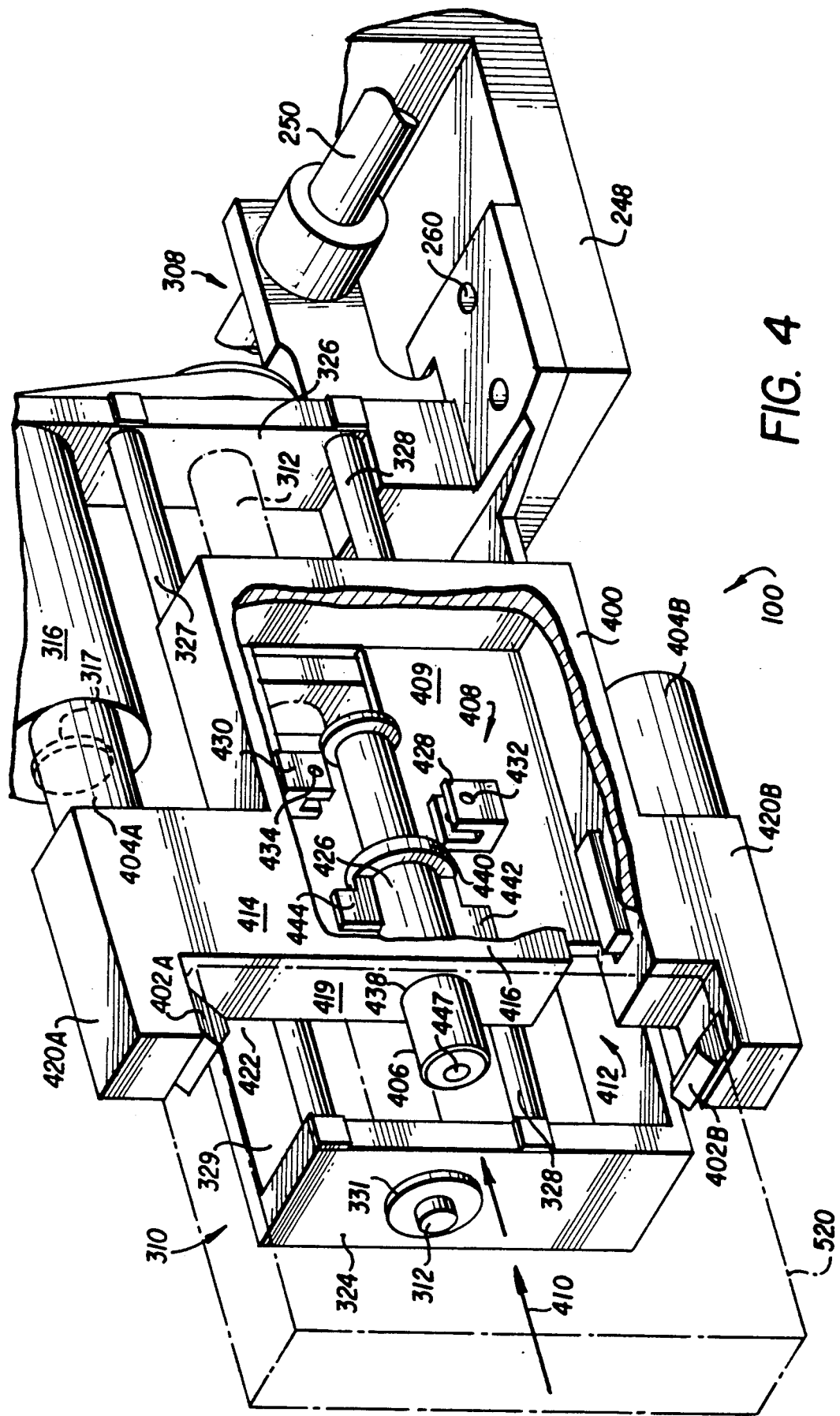
FIG. 4 is an isometric view of a cartridge transport assembly and a Z-carriage of the cartridge library system of the embodiment of FIG. 1.

The Z displacement system 108, partially shown in FIGS. 3 and 4 and better illustrated in FIGS. 5A, 5B, 6A, and 6B, is anchored to X-carriage 248 by fasteners 260 (see FIG. 4). The Z displacement system 108 includes a mounting block 308; a Z-frame 310; a Z-worm gear 312; a Z-drive motor 316 with an associated tachometer 317; and, a Z-direction displaceable carriage, also known as Z-carriage 318 (see FIG. 5B).

The Z-frame 310 of the Z displacement system 108, essentially rectangular in shape, is illustrated in FIGS. 5A, 5B, 6A, and 6B. The Z-frame 310 includes frame front panel 324; frame rear panel 326, frame upper guide rail 327; frame lower guide rail 328; and, frame left side panel 329.

The Z-frame rear panel 326 extends to a height greater than the frame front panel 324. Near its top the Z-frame rear panel 326 carries the Z-drive motor 316, with an output shaft of the Z-drive motor 316 extending rearwardly through an aperture provided in the frame rear panel 326. The Z-drive motor 316 has a pulley 330 mounted on its output shaft.

The Z worm gear 312 has its front end rotatably retained by bushing 331 in the frame front panel 324. The rear end of the Z worm gear 312 is rotatably retained by bushing 332 in the frame rear panel 326. A portion of the rear end of Z worm gear 312 extends rearwardly beyond the frame rear panel 326 and has pulley 333 mounted thereon. A drive belt 334 entrains the pulley 330 (mounted on the output shaft of the Z-drive motor 316) and the worm gear pulley 333 (see FIGS. 5A and 6A).

Figure 5B:
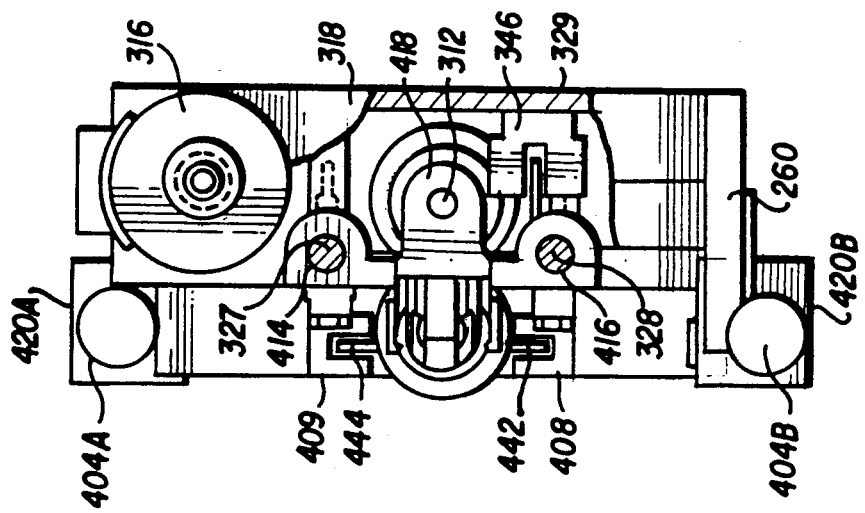
FIG. 5B is a rear view, partially sectioned, of a cartridge transport assembly and a Z-carriage of the cartridge library system of the embodiment of FIG. 1, with the cartridge transport assembly shown in a retracted position.
Figure 6A:
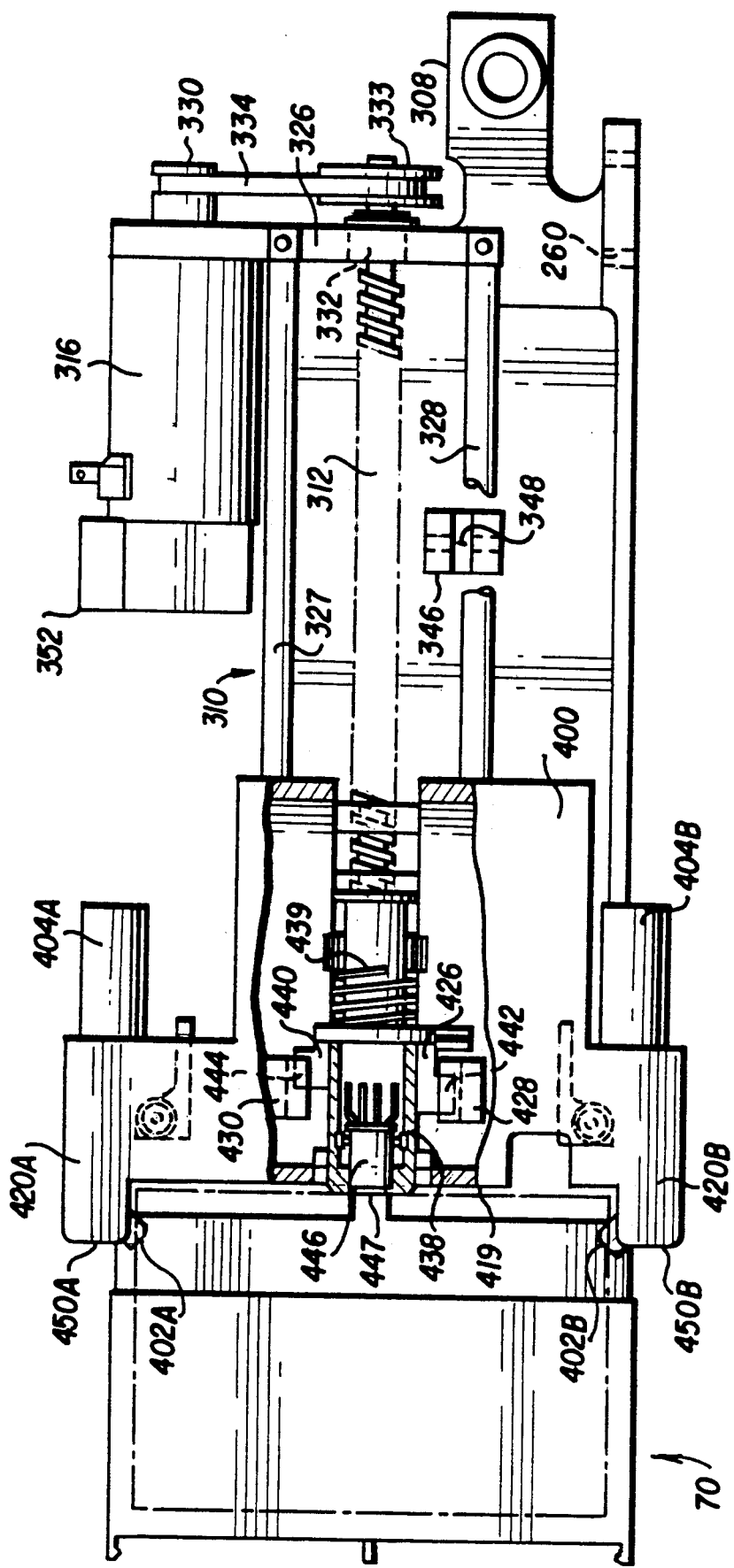
FIG. 6A is a side view, partially sectioned, of a cartridge transport assembly and a Z-carriage of the cartridge library system of the embodiment of FIG. 1, together with a rack for storing a plurality of cartridges, with the cartridge transport assembly shown in an extended position engaging a cartridge in the rack.

The Z-frame left side panel 329 has a Z-home sensor 346 mounted thereon (see FIGS. 5B and 6A). As in the manner of other sensors described herein, the Z-home sensor 346 is essentially U-shaped, with a central channel or cavity through which a corresponding obstruction element may traverse. A first leg of the Z-home sensor 346 has a photoemitter element mounted therein, while a second leg of the Z-home sensor 346 has a photodetector element mounted therein in alignment with the photoemitter element, such that an interruptable detection beam 348 is provided.

Figure 13:
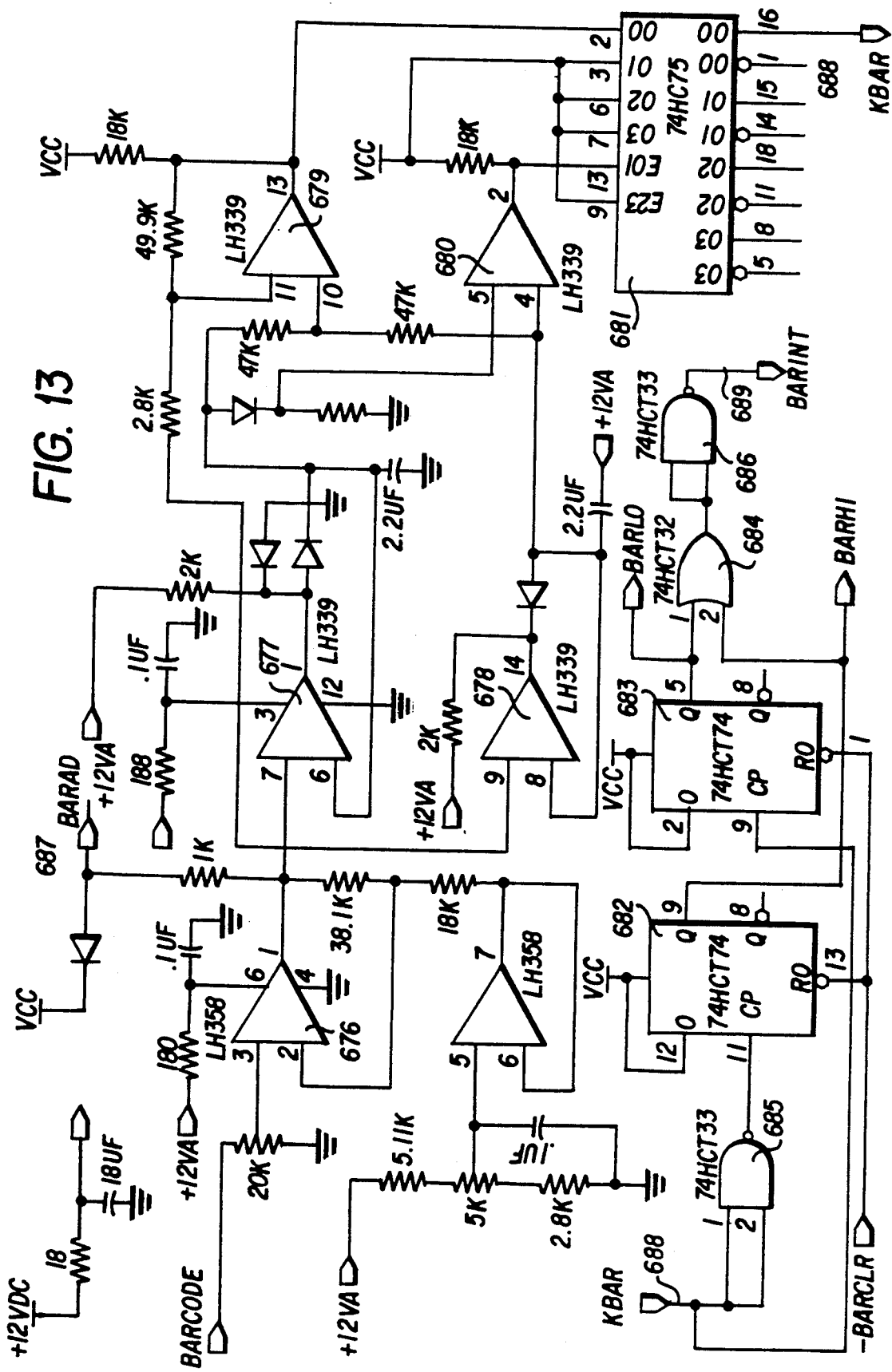
FIG. 13 is a schematic view of a bar code conditioning circuit included in the electronic circuitry of FIGS. 12A, 12B, and 12C.

As shown in FIG. 13, the cartridge transport assembly 100 carries, above plates 372 and 378, a Z overtravel sensor 384. The overtravel sensor 384 is essentially identical to other similar sensors described herein, having a cavity between U-shaped legs. When the cavity is obstructed, a beam between the legs is interrupted and a signal generated. The cavity of the Z overtravel sensor 384 is positioned to be possibly obstructed by either the limit finger 340 or the limit finger 342.

STRUCTURE: CARTRIDGE TRANSPORT ASSEMBLY

The cartridge transport assembly 100 comprises a cartridge transport frame 400; cartridge engagement means, particularly cartridge engagement fingers 402A and 402B; cartridge engagement/disengagement actuator means, such as solenoids 404A and 404B; and, cartridge locator means 406 (which, in turn, includes cartridge engagement sensor means 408 and cartridge abutment sensor means 409).

As described hereinafter, the cartridge transport assembly 100 is maneuvered by the operation of the X, Y, and Z displacement systems 104, 106, and 108, respectively, to a coordinate location associated with a requested one of the cartridges 71 in the cartridge library. As the cartridge engagement fingers 402A and 402B of the cartridge transport assembly 100 ride along the cartridge, the cartridge engagement fingers 402A and 402B engage corresponding changer grip notches provided on the standard cartridge. The cartridge engagement fingers 402A and 402B then are self-locked in an engagement orientation (see FIG. 17C). The cartridge transport assembly 100 is then maneuvered to a target drive 56, under the control of the X, Y, and Z displacement systems 103, 106, and 108, respectively. At the target drive 56, the cartridge abutment sensor means 409 detects that the cartridge is in a position to be released. The solenoids 404A and 404B are then activated, causing the cartridge engagement fingers 402A and 402B to retract to a release or disengagement orientation (see FIG. 17E). Under the control of the X, Y, and Z displacement systems 104, 106, and 108 the cartridge transport assembly 100 then backs away from the target drive 56 and subsequently reproaches along a different trajectory for closing the door 60 of the target drive 56.

As shown in FIG. 4, a center line 410 of cartridge transport frame 400 is parallel with a direction of cartridge approach. As used herein, "direction of cartridge approach" is described as what is seen by the cartridge transport assembly 100, although it is the assembly 100, not the cartridge, that is moving.

The side of cartridge transport frame 400 that faces the Z-carriage 318, i.e., the side hidden from view in FIG. 4 but shown on edge in FIG. 5B, has two cylindrical apertures 414 and 416 formed thereon. The aperture 414 accommodates the upper guide rail 327 of the Z-carriage 318; the aperture 416 accommodates the lower guide rail 328 of the Z-carriage 318. Bearing surfaces are provided on the interior of the cylindrical apertures 414 and 416 to facilitate essentially frictionless sliding of the cartridge transport frame 400 over the guide rails 327 and 328.

Between the two cylindrical apertures 414 and 416 is a sleeve 418 which has a cylindrical aperture formed therein. The cylindrical aperture in sleeve 418 is counter-threaded to receive the worm gear 312. As will be shown hereinafter, when the Z-motor 316, via the drive belt 334, causes rotation of the worm gear 312, the cartridge transport frame 400 travels along the guide rails 327 and 328 in the Z direction.

The cartridge transport frame 400 has upper mounting block 420A and lower mounting block 420B integrally formed thereon. Upper mounting block 420A extends upwardly from the cartridge transport frame 400 as shown in FIGS. 4, 5A, and 5B, while lower mounting block 420B extends downwardly from the cartridge transport frame 400. The front of the cartridge transport frame 400 has a cartridge reference surface 419 which is perpendicular to the direction of cartridge approach 410.

The cartridge transport frame 400 has a side panel 411 upon which are mounted a stationary plunger block 426, and detectors 428 and 430 included in the cartridge engagement sensor means 408 and the cartridge abutment sensor means 409, respectively. These detectors 428 and 430 are of the type wherein a phototransmitter mounted on one leg directs a beam across a cavity to a photoreceiver mounted on the other leg. In particular, the detector 428 directs a cartridge engagement sensor beam 432, while the detector 430 directs an abutment sensor beam 434.

The cartridge locator means 406 includes a spring loaded plunger 438. The plunger 438 slidably extends through a central bore in the plunger block 426. A first end of the plunger 438 is biased by biasing spring 439 to extend through a aperture formed in cartridge reference surface 419 of the transport frame 400. As described further below, when this first end of the plunger 438 contacts an engaged cartridge and experiences a contact force greater than the biasing force exerted by the spring 439, the engagement contact force causes the plunger 438 to be retracted in the approach direction 410 back toward the library door 26. A second end of the plunger 438 is affixed to travelling interrupter element 440.

The travelling interrupter element 440 has two detector blockage fins 442 and 444 mounted thereon. The blockage fins 442 and 444 are so positioned that blockage fin 442 obstructs the engagement sensor beam 432 when a cartridge is engaged by the cartridge transport assembly 100, and blockage fin 444 obstructs the abutment sensor beam 434 when an engaged cartridge experiences pressure by an abutment contacting the cartridge. In this respect, the abutment sensor beam 434 is position further away from the cartridge reference surface 419 than the engagement sensor beam 432.

A bar code reader 446 is mounted in the interior of the cartridge locating plunger 438. The bar code reader 446 has a lens 447 which is centrally mounted at the frontmost extent of the plunger 438. The bar code reader 446 also includes a printed circuit board 448 which is also housed in the interior of the plunger 438. The circuitry of board 448 is described in greater detail in connection with FIG. 14.

The mounting blocks 420A and 420B of the cartridge transport frame 400 serve as door rams, particularly upper door ram 450A and lower door ram 450B. Each door ram 450A, 450B has a finger guide means provided therein, particularly rectangularly-shaped finger slot 493, as well as a biasing cavity 494. The finger slots 493 have center lines which are oriented at an angle 495 with respect to the direction of cartridge approach 410 (see FIG. 5A). The angle 495 is preferably 45 degrees.

As shown in FIGS. 14A and 14B, the cartridge engagement fingers 402A, 402B, being essentially rectangular in shape, captively reside in respective finger slots 493A, 493B. The cartridge engagement fingers 402, like the finger slots 493, have central axes 498 which, when in the engagement mode as shown in FIG. 14A, are oriented at the angle 495 with respect to the direction of cartridge approach 410. Each cartridge engagement finger 402 has a first end thereof which extends beyond the door ram 450 in which it captively resides. A second end of each cartridge engagement finger 402 has biasing means bearing thereagainst, particularly torsion spring 499. Torsion spring 499 is coiled around a post 500 sandwiched in biasing cavity 494.

As shown in FIG. 5A, the two solenoids 404A, 404B each have output plungers 501A, 501B, respectively, extending therefrom. A distal end of each solenoid plunger 501 is connected by fastener 502 to a pivoting linkage member 503. The pivoting linkage member 503 is pivotally mounted about post 504 to the cartridge transport frame 400 side panel 411. The pivoting linkage member 503 has a projection 505 provided thereon which extends into an accommodating cavity provided in the cartridge engagement finger 402. As will be seen hereinafter, actuation of the solenoid 404 causes retraction of the solenoid plunger 501, which in turn causes the pivoting linkage member 503 to pivot about post 504. For example, retraction of the solenoid plunger 501A causes 404A causes the pivoting linkage member 503A to pivot in a clockwise sense (as seen in FIG. 5A) about the post 504, thereby overcoming the biasing force provided by torsion spring 499 and causing finger 402A to retract. Limit pins 506 and 508 serve to partially define the finger slots 493 and to serve as limit stops to limit the degree of rotation of the pivoting linkage member 503 about post 504.

The configuration of a cartridge engagement finger 402 is illustrated with reference to FIG. 17A. Each cartridge engagement finger 402 has the following surfaces formed at its first end (i.e. the end that protrudes out of the door ram 450): finger first surface 510; finger second surface 512; finger third surface 514; and, finger fourth surface 516. The first and second surfaces 510 and 512 are opposing planar surfaces and are both parallel to the finger axis 498 (and thus to the slot axis). Accordingly, surfaces 510 and 512 are oriented at the angle 495 with respect to the direction of cartridge approach 410. The finger third surface 514 is perpendicular to both the finger first surface 510 and the finger second surface 512. The finger fourth surface 516 is oriented at 45 degrees with respect to both the finger first surface 510 and the finger third surface 514, and is intermediate the surfaces 510 and 514. The finger first surfaces 510 is contiguous with the finger fourth surfaces 516; the finger fourth surface 516 is contiguous with the finger third surface 514; and, the finger third surface 514 is contiguous with the finger second surface 510.

Figure 17A:
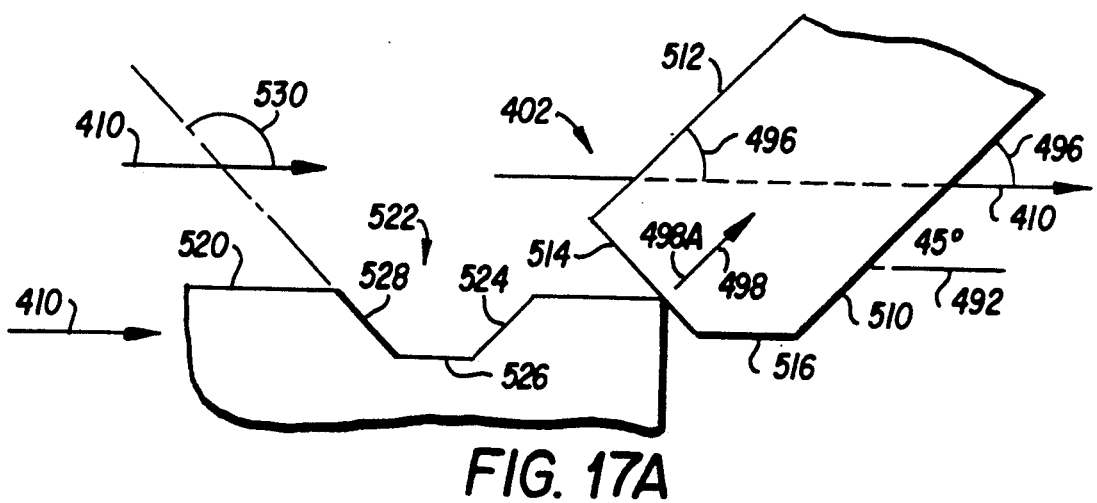
FIG. 17A-17E are schematic views showing sequential steps involved in the engagement and disengagement of a cartridge by cartridge engagement fingers included in the cartridge library system of the embodiment of FIG. 1.

FIG. 17A also shows a portion of a standard 8 mm magnetic tape cartridge 520. The standard magnetic tape cartridge 520 is provided with a pair of changer grip notches 522, which are spaced from the rear of the cartridge by about 0.2 inches. Each cartridge notch 522 has three surfaces: cartridge notch first surface 524; cartridge notch second surface 526; and, cartridge notch third surface 528. The cartridge notch first surface 24 is oriented at the angle 496 with respect to the direction of cartridge approach 410; the cartridge notch third surface 524 is oriented at an angle 530. As mentioned before, angle 496 is 45 degrees; angle 530 is 35 degrees. The cassette notch second surface 526 is parallel with the direction of cartridge approach 410. The length the finger fourth surface 516 as shown in FIG. 7A corresponds with the length of the cartridge notch second surface 526, which is on the order of about 0.048 inch.

STRUCTURE: LIBRARY COMPUTER AND ELECTRONICS

Figure 12A:
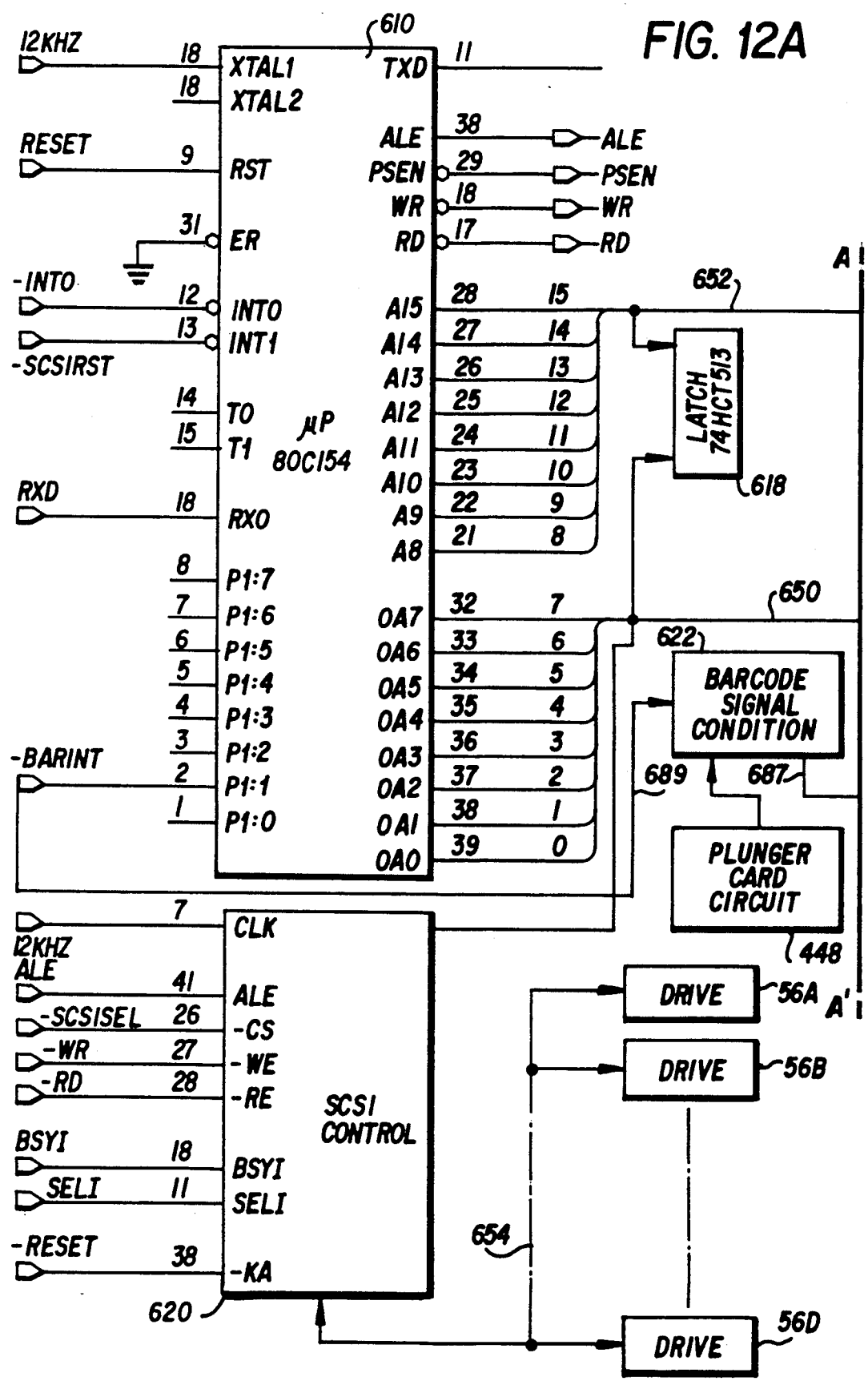
FIGS. 12A, 12B, and 12C are schematic views of electronic circuitry included in the cartridge library system of the embodiment of FIG. 1.
Figure 12B:
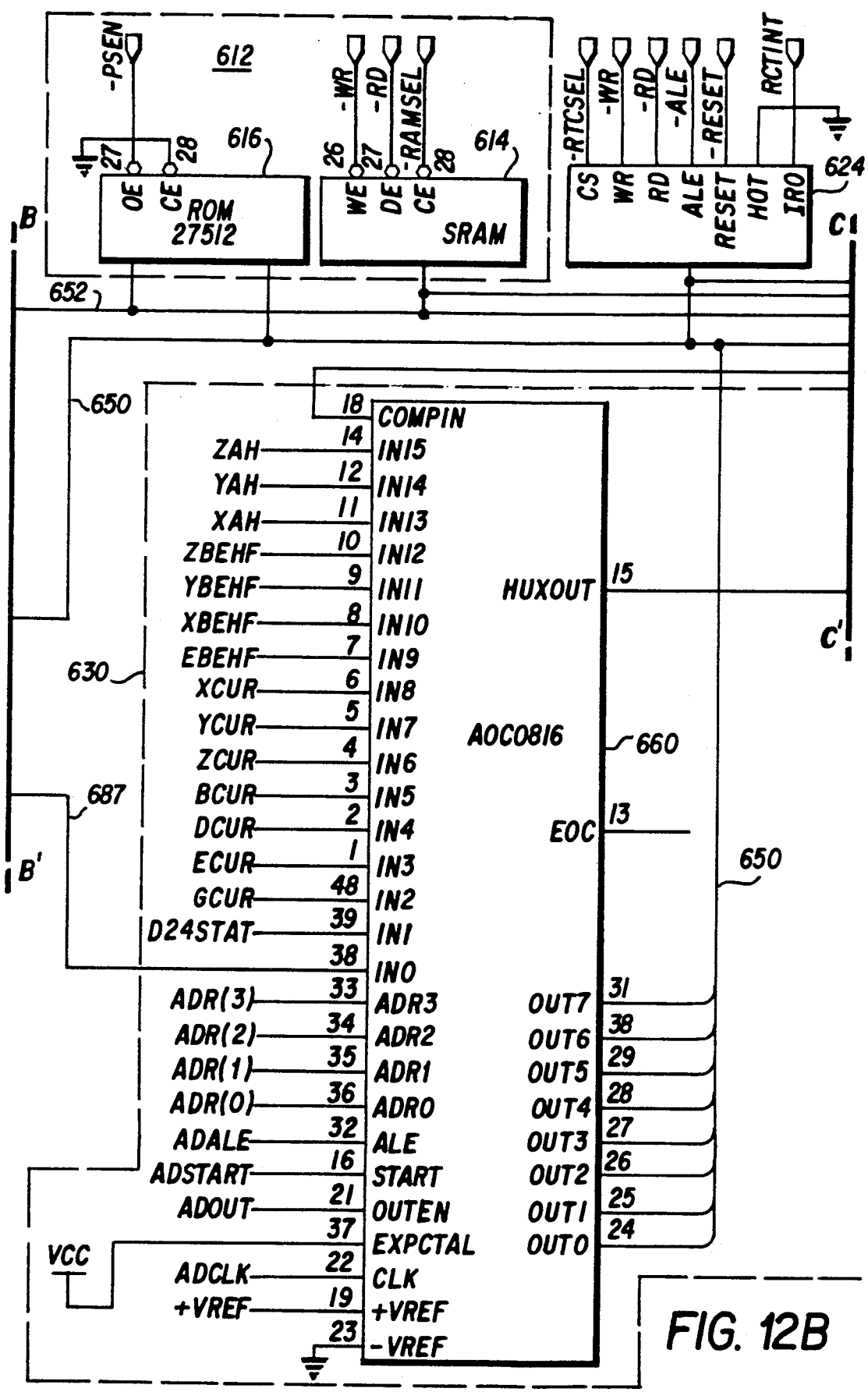
Figure 12C:
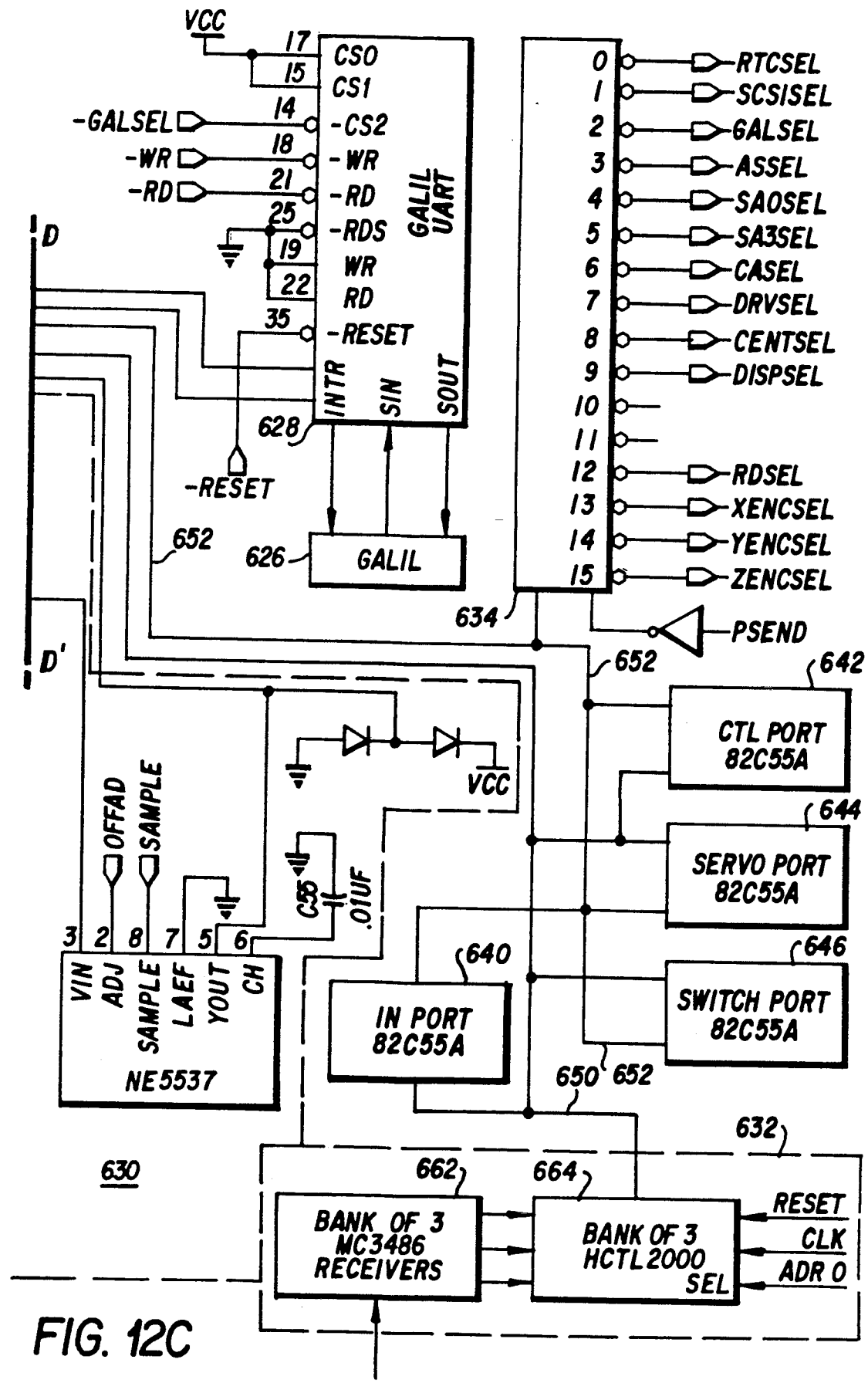

The LC computer 22 includes a circuit board housing 600; a CRT monitor 602; and, a keyboard 604. The electronics associated with the library system of the invention includes the circuit of FIGS. 12A, 12B, and 12C. FIGS. 12A, 12B, and 12C illustrate circuitry mounted within the library cabinets 24, as well as the bar code reader/plunger circuit board 448 located on the plunger 438 of the cartridge transport assembly 100.

The circuit of FIGS. 12A, 12B, and 12C includes a microprocessor 610; a memory section 612 (including SRAM 614 and ROM 616); an octal latch 618; a SCSI Controller 620; a bar code signal conditioning circuit 622; a real time clock interrupt generating chip 624; a three axis control card 626; a three axis control interface chip 628; an analog-to-digital converter (ADC) section; a quadrature decoder and differential receiver section 632; an address decoder/device select chip 634; and, a series of ports including an INPORT 640; a CTL PORT 642; a SERVO PORT 644; a SWITCH PORT 646; and, an unillustrated DISPLAY PORT.

As is shown in FIG. 12A, 12B, and 12C and discussed hereinafter, the elements of FIG. 12A, 12B, and 12C are connected by a an eight bit data bus 650 and/or a 16 bit address bus 652. In addition, an unillustrated control bus carries signals to appropriate pins of certain elements of FIGS. 12A, 12B, and 12C, including the signals WR, RD, PSEN, ALE, RESET, and certain chip select signals.

The microprocessor 610 has pins 32-39 connected to the data bus 650 and pins 21-28 connected to the upper eight order bits of the address bus 652. When necessary, lower order bits for the address bus 652 are applied from the microprocessor 610 using the data bus 650 and the octal latch 618 according to conventional techniques. Pin 2 of the microprocessor 610 is connected to receive a priority interrupt whenever an interrupt is generated by the bar code reader 446. Pin 12 of the microprocessor 610 is connected to receive an interrupt signal whenever any other system interrupt occurs. Examples of these other system interrupts include an interrupt from the three axis control card 626 (via interface 628); an interrupt from the real time interrupt generating chip 624; and, an interrupt from the SCSI controller 620.

The SCSI controller 620 is used to control the transport operations to and from the cartridge drives 56A, 56B, 56C, and 56D employed by the cartridge library 20. The SCSI controller 620, which includes a controller chip having part number WD33C92A₁ is connected to the library computer 22 by drive bus 654.

ROM 616 included in the memory section 612 has stored therein inter alia the operating software for the cartridge library 20, i.e. the coded instructions executed by the microprocessor 610. The SRAM, 614 has stored therein a data look-up table (also known as a library map) which includes the X, Y, and Z coordinates of each of the cartridge cells and fixed position cartridge holders 78 housed in the cartridge library 20, as well as the X, Y, and Z coordinates of each of the cartridge drives 56A, 56B, 56C, and 56D.

In conjunction with the three axis control card 626, the microprocessor 610 receives signals from the library computer 22 and sends signals to the cartridge library system 20 for controlling the X, Y, and Z displacement systems 104, 106, and 108, respectively. The three axis control card 626 is electrically connected via the interface chip 628 to the remainder of the FIGS. 12A, 12B, and 12C circuitry. In the illustrated embodiment, the three axis control card 626 is provided by Galil Motion Control, Inc., as model DMC-230, the operation of which is understandable from the DMC-230 Series User Manual.

The analog-to-digital converter (ADC) section 630 includes an ADC chip 660 which receives analog signals at various input pins. A signal is applied to the ADC chip 660 to indicate which of the input analog signals is to be converted to a digital format. The converted digital signal is applied at pins 24-31 to the data bus 650. The ADC chip 660 receives a signal on line 687 from the conditioning circuitry of FIG. 13 for use in focusing the bar code reader 446.

The quadrature decoder and differential receiver section 632 includes a bank 662 of three receivers and a bank 664 of three quadrature decoders. Receivers in bank 662 receive signals from the Y tachometer 148, the X tachometer 274, and the Z tachometer 317. The tachometers 148, 274, and 317 are also known as encoders which send signals differentially via appropriate cables to the receivers in bank 662. The output pins of each receiver in bank 662 are connected to input pins of a corresponding one of three decoders include in quadrature decoder bank 664. The output pins of each of the three decoders included in bank 664 are connected to the data bus 650. At any given instant of time the element included in the bank 632 contain values indicative of the current X, Y, and Z coordinates of the cartridge transport assembly 100. These coordinate values are accessed by the microprocessor 610 via the data bus 650.

The address decoder/device select chip 634 is used to designate where information applied on the data bus 650 and/or the address bus 652 is to be applied or obtained (i.e., to which or from which of the elements included in the circuit of FIGS. 12A, 12B, and 12C the information is to be gated). To this end, the select chip 634 has output pins from which signals are applied to the "select" pins of various other chips, including the chips illustrated in FIGS. 12A, 12B, and 12C.

As shown in FIGS. 12A, 12B, and 12C, each of the ports INPORT 640, CTL PORT 642, SERVO PORT 644, and SWITCH PORT 646 are connected to the data bus 650 and to the address bus 652. In addition, each of these ports are connected to the unillustrated control bus to receive signals such as the RD, WR, RESET, and chip select signals.

The INPORT 640 has output pins connected to the X-motor 254, the Y-motor 118; and the Z-motor 316 for directing these motors to displace their respective carriages in either a positive or negative direction. In addition, the INPORT 640 has output pins connected to the door lock solenoid 82; to the solenoid of the Y-direction locking system 124; to the engagement finger solenoids 404A and 404B carried on the cartridge transport assembly 100 (see FIG. 4).

The SERVO PORT 644 has pins connected to receive signals from the Y-direction sensors 120 and 122 and from the X-direction sensors 256 and 258. In addition, the BARLO and BARHI signals of FIG. 13 are connected to the SERVO PORT 644.

The SWITCH PORT 646 has pins connected to the Y-home sensor 121, the X-home sensor 257, and the Z-home sensor 346. In addition, the cartridge engagement sensor 408 and the abutment sensor 409 are connected to pins of the SWITCH PORT 646.

Figure 14:
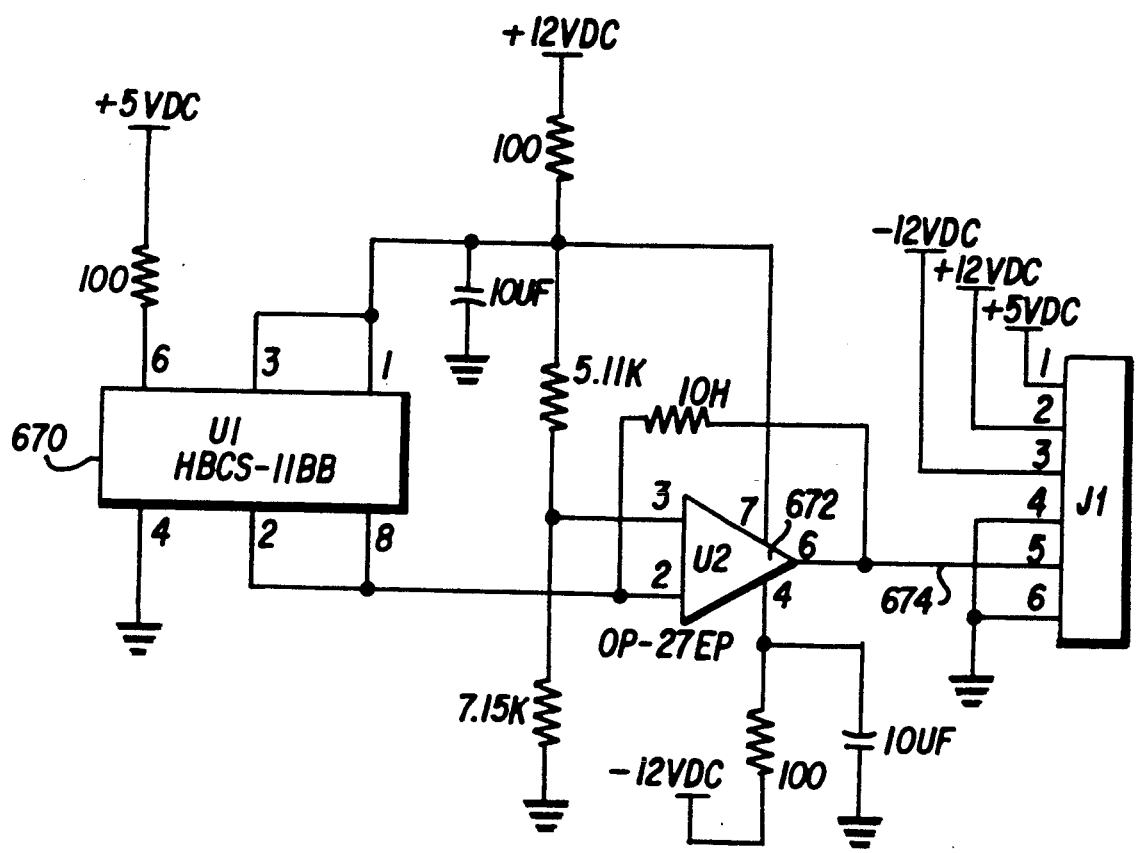
FIG. 14 is a schematic view of a bar code reader/plunger card circuit included in the electronic circuitry of FIGS. 12A, 12B, and 12C.

The bar code reader/plunger card circuit 448, which is physically mounted in the plunger element 438 as already described, is shown in FIG. 14. The circuit of FIG. 14 includes an optical reflective sensor 670, which is of the type manufactured by Hewlett-Packard as part number HBCS-1100. An output signal from the sensor 670 is amplified by operational amplifier 672. The output signal from op amp 672 of the bar code reader/plunger card circuit 448 is applied by cable 674 to the bar code signal conditioning circuit 622.

The bar code signal conditioning circuit 622 is shown in detail in FIG. 13. The conditioning circuitry 622 of FIG. 13 includes operational amplifiers 676, 677, and 678; comparators 679 and 680; flip-flops 681, 682, and 683; NOR gate 684; and, NAND gates 685 and 686. An output signal of operational amplifier 767, used for focusing the bar code reader 446, is applied on line 687 to the input pin 38 of the ADC chip 660.

Operational amplifiers 677 and 678 function as upper and lower peak detectors of the analog signal output from the operational amplifier 676. The output signal of operational amplifier 677 of the bar code signal conditioning circuit 622 is a analog signal which is applied to comparator 679. When the analog output signal from op amp 677 exceeds a reference value, indicating reception of reflected energy above a threshold value, an output signal from the comparator 679 triggers the flip-flop 681. Accordingly, a train of output pulses from flip-flop 681 appears on line 688. Comparator 680 is used for noise control.

The pulse train on line 688 is applied to falling edge flip-flop 683 and via NAND gate to the rising edge flip-flop 682. Flip-flop 682 latches the rising edge of the digital signal of line 688 as a BARLO signal; flip-flop 683 latches the falling edge of the digital signal of line 688 as a BARHI signal. The BARLO and BARHI signals from flip-flops 682 and 683 are applied to the series connection of NOR gate 684 and NAND gate 686. The output terminal of NAND gate 686 is connected by line 689 to the interrupt pin (pin 2) of the microprocessor 610. Thus, the microprocessor 610 is interrupted with each rising and falling edge of the digital signal of line 688. Using the interrupts on line 689 the microprocessor 610 can determine the pulse width of the digital signal of line 688, and hence a bar code pattern.

STRUCTURE: CARTRIDGE RACK

Figure 15:
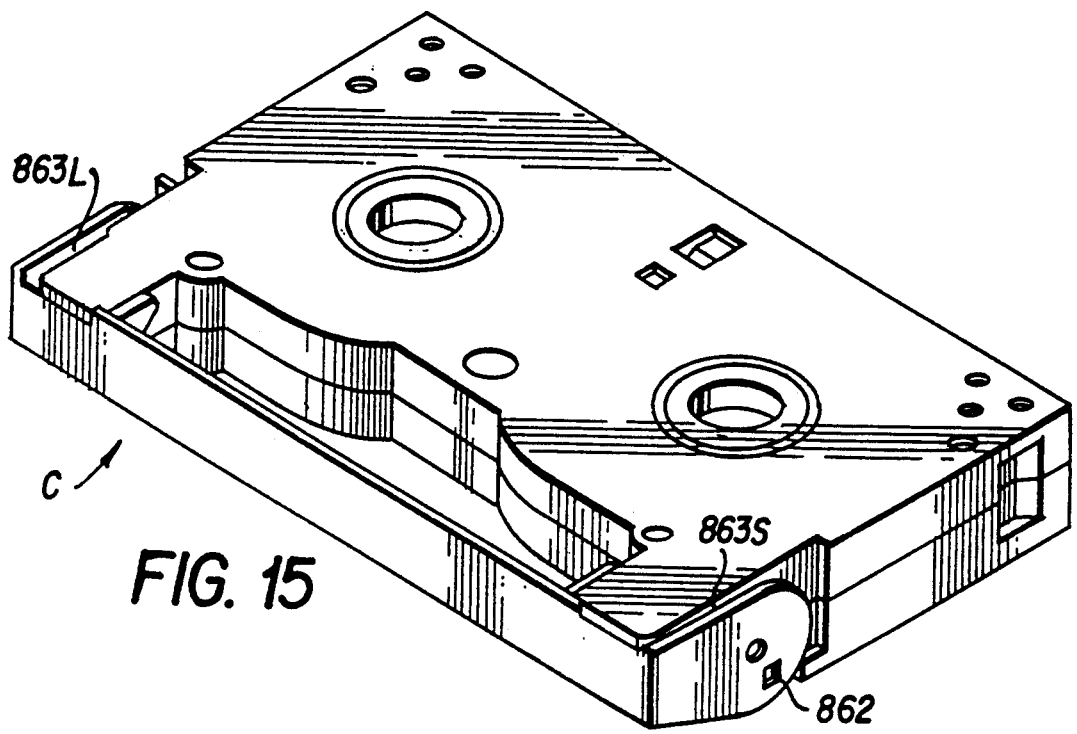
FIG. 15 is a bottom isometric view showing a magnetic tape cartridge of the type storable in the rack of the embodiment of FIG. 1.

FIGS. 7–10 show one of the racks 70 included in the cartridge library system 20. A plurality of information storage medium cartridges, such as the standard 8 mm magnetic tape cartridge C shown in FIG. 15, are storable in the rack 70 of the invention. As used herein, "information storage medium" includes, but is not limited to, magnetic tape. "Information" includes audio-producing signals as well as data-producing signals.

FIGS. 11A and 11B show one of the rack extrusion mounts 76 by which the racks 53 are mounted to the cabinet wall 51.

Figures 8A, 8B:
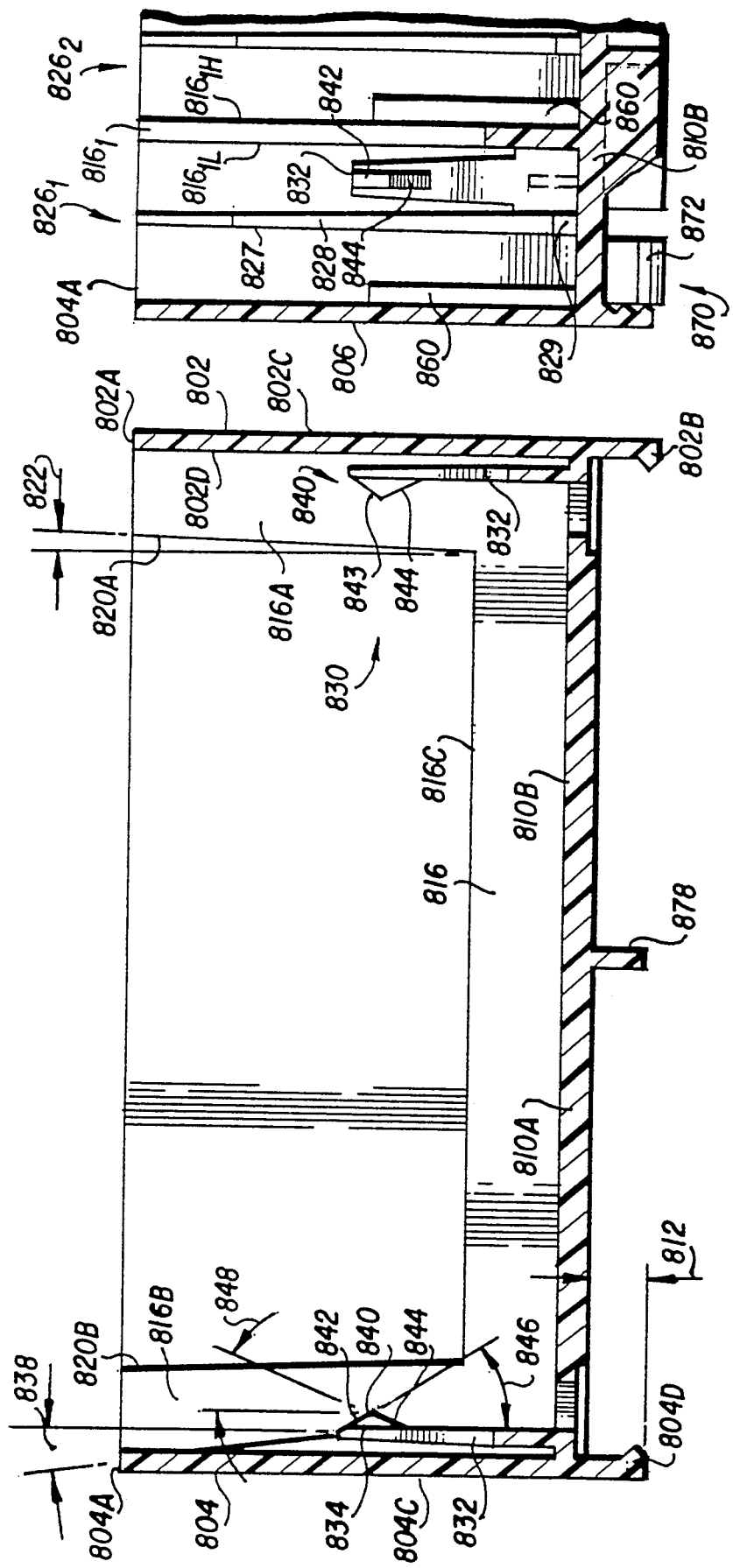
FIG. 8A is a sectioned side view, taken along line 8A—8A, of FIG. 7.
FIG. 8B is a sectioned view, taken along line 8B—8B, of FIG. 7.

Each rack 70 is essentially rectangular in shape, having two opposing parallel side walls 802 and 804; two opposing parallel end walls 806 and 808; and, a bottom wall 810. Side walls 802 and 804 have respective top edges 802A and 804A; respective bottom edges 802B and 804B; respective exterior surfaces 802C and 804C; and, respective interior surfaces 802D and 804D. The bottom wall 810 has an exterior surface 810A and an interior surface 810B. As shown in FIG. 8A, the bottom wall 810 is spaced away from the bottom edges 802B and 804B of the side walls 802 and 804 by a distance 812.

The rack 70 is partitioned into a plurality of cells by eight ribs 816 and a bridging member 818. The bridging member 818 is positioned midway between the end walls 806 and 808 (to which bridging member 818 is parallel). The bridging member 818 spans the side walls 802 and 804 (to which bridging member 818 is perpendicular). Thus, four ribs 816 (in particular ribs $816_1$–$816_4$ shown in FIG. 7) are located on a first side of the bridging member 818, while four other ribs 816 (ribs $816_5$–$816_8$) are located on a second side of the bridging member 818.

Figure 7:
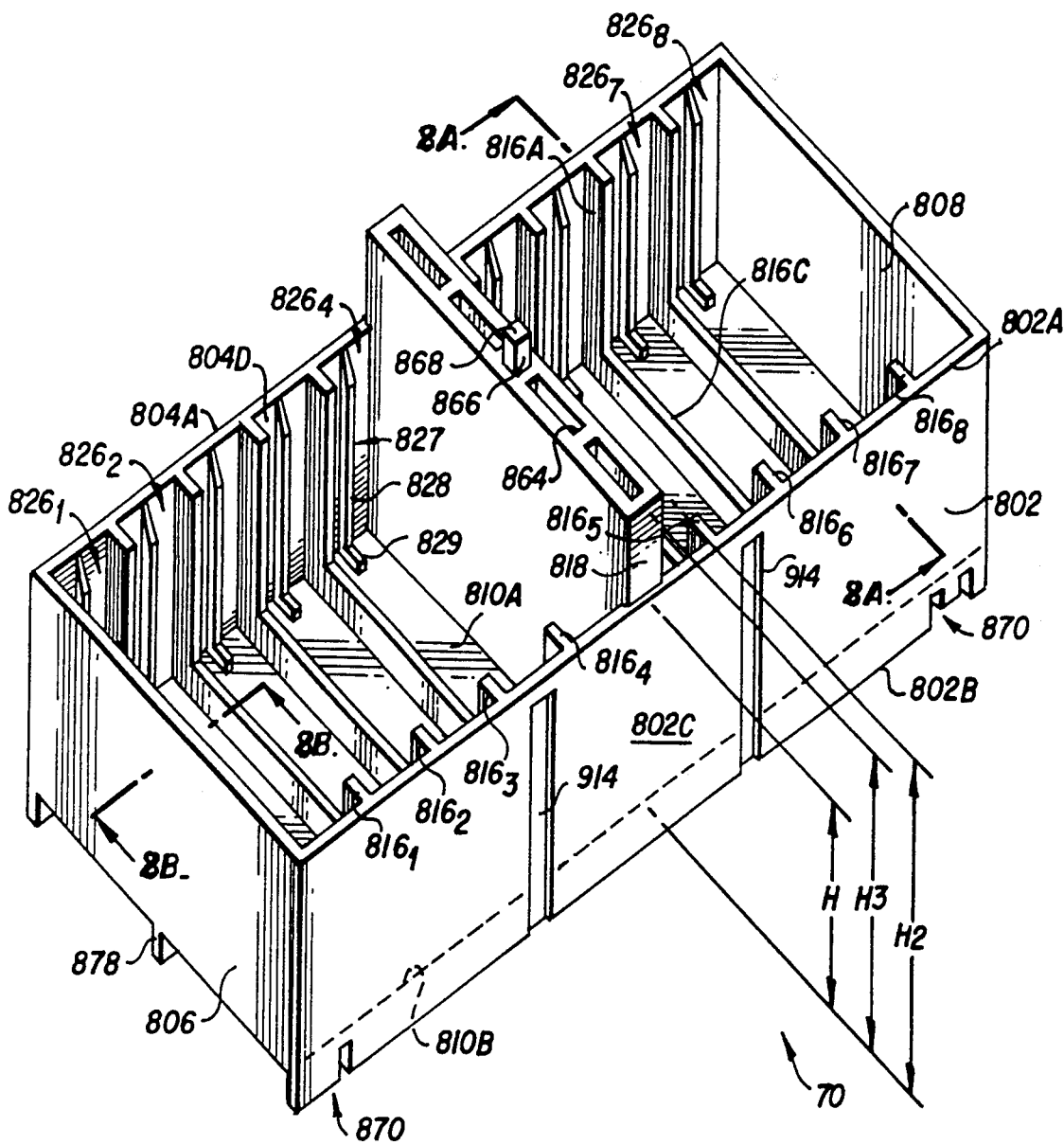
FIG. 7 is an isometric view of a rack for storing a plurality of cartridges in the cartridge library system of the embodiment of FIG. 1.

As shown in FIGS. 7 and 8, each of the ribs 816 have two rib wall members 816A and 816B and a rib floor member 816C. The two rib wall members 816A and 816B of each rib 816 are coplanar and lie in a plane which is both parallel to the end walls 806 and 808 and perpendicular to the side walls 802 and 804. The two rib wall members 816A and 816B are attached to the interior side wall surfaces 804C and 802C, respectively. The rib floor member 816 is attached to the rack bottom wall 810.

The two rib wall members 816A and 816B have interior edges 820A and 820B, respectively. The rib wall interior edges 820A and 820B are inclined at an angle 822 of about 1.5 degrees with respect to the planes of the side wall interior surfaces 802D and 804D, respectively.

The ribs 816 are separated from one another (and from the bridging member 818) by a distance just sufficiently large to accommodate a standard 8 mm magnetic tape cartridge therebetween. Thus, two adjacent ribs 816, or the bridging member 818 and an adjacent rib 816, form a cartridge cell 826 for accommodating a cartridge.

As mentioned above, eight such cartridge cells 826 (cells $826_1$–$826_8$) are provided in the rack 70. Four of the cells (cells $826_1$–$826_4$) are provided on a first side of the bridging member 818; four of the cells (cells $826_5$–$826_8$) are provided on a second side of the bridging member 818. Each rib 816 has a rib surface which faces a lower order cell and a rib surface which faces a higher order cell. For example, with reference to FIG. 8B, the wall of rib $816_1$ has a rib surface $816_{1L}$ which faces cell $826_1$ and a rib surface $816_{1H}$ which faces cell $826_2$.

Each cell 826 is subpartitioned into half cells by a pair of opposed secondary ribs 827. As shown in FIGS. 7 and 8A, each secondary rib 827 comprises a secondary rib wall spine 828 and a secondary rib foot 829.

As shown in FIG. 8A, the rack 70 has retaining means 830 provided in each cell 826 for securely retaining therein an inserted cartridge. The retaining means 830 includes a pair of resilient, cantilevered retaining fingers 832 provided in each cell 826. A proximal end of each retaining finger 832 is integrally formed with the rack bottom wall 410; the distal end each retaining finger 832 extends upwardly into the interior of its associated cell 826. As shown in FIG. 8B, both retaining fingers 832 for each pair are provided on second sides of the secondary ribs 827 which partition the cell 826 into subcells.

Each retaining finger 832 has an interior surface 834 which faces the interior surface of the opposing retaining finger with which it is paired. When a cell 826 is empty, the retaining finger interior surfaces 834 are essentially parallel to the side wall interior surfaces 802D and 804D. However, when a cartridge is inserted into a cell 826, the retaining fingers 832, and hence the retaining finger interior surfaces, flex back toward the side wall interior surfaces 802D and 804D to accommodate the cartridge therebetween.

Near its distal end, and commencing at point 836 on the interior surface 834 thereof, each retaining finger 832 is beveled to taper at an angle indicated by reference numeral 838 (see FIG. 8A), which is on the order of about 6 degrees. At its distal end each retaining finger 832 has a chevron-shaped projection 840 provided thereon. The chevron-shaped projections 840 face into the interior of the cell 826 and include a first chevron face 842 and a second chevron face 844. As shown in FIG. 8A, the first chevron face 842 is inclined at an angle (indicated by reference numeral 846) with respect to the retaining finger interior surface 834; the second chevron face 844 is inclined at an angle (indicated by reference numeral 848) with respect to the beveled end surface of the retaining finger interior surface 834. In the illustrated embodiment, angle 846 is on the order of about 32 degrees; angle 848 is on the order of about 20 degrees.

Figure 8C:
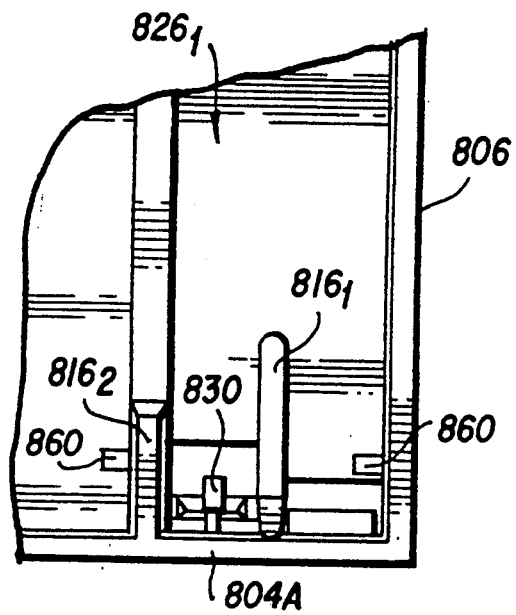
FIG. 8C is a top view of a portion of the rack of FIG. 7.

As shown in FIGS. 8A and 8C, each rib 816 has a cartridge lid gap engagement ridge 860 formed thereon. The cartridge lid gap engagement ridge 860 is formed on the surface of rib wall 816B which faces the higher order cell. For example, in FIG. 8A the cartridge lid gap engagement ridge 860 is formed on the surface $816_{1H}$, so that the ridge 860 extends into cartridge cell $826_2$.

The interior surface of rack end wall 806 and the bridging member 818 also have cartridge lid gap engagement ridges 860 formed thereon. As shown in FIG. 8B, the cartridge lid gap engagement ridge 860 formed on the end wall 806 extends into the cartridge cell $826_1$. Although not visible in the figures, it should be understood that the bridging member 818 has a cartridge lid gap engagement ridge 860 thereon which extends into the cartridge cell $826_5$.

As illustrated in FIG. 8C, the cartridge lid gap engagement ridges 860 are spaced away from the rack wall interior surface 804D by a slight distance on the order of about 0.063 inches. The cartridge lid gap engagement ridges 860 extend about half the height of the rack wall interior surface 804D and are parallel thereto.

With the rack 70 and cells 826 thereof configured in the manner just described, the chevrons 840 provided on the pair of retaining fingers 832 for each cell 826 are shaped and positioned to engage light path windows 862 provided on opposite sides of a lid of a standard 8 mm magnetic tape cartridge (see FIG. 15), when a cartridge is inserted into the cell. Location of the retaining fingers on one side of the secondary ribs 827 prevents a cartridge from cartridge being inserted into the cell 826 in any other but a predefined required orientation.

In addition, when a cartridge is inserted into a cell 826, the cartridge C slidingly fits over the cartridge lid gap engagement ridge 860. In this respect, when viewed from its bottom, a standard 8 mm magnetic tape cartridge such as cartridge C of FIG. 15 has a pair of lid gaps 863L and 863S occurring between the cartridge lid and respective end faces of the cartridge case. One of the gaps (gap 863L) is larger than the other gap (863S). The cartridge lid gap engagement ridge 860 is sized so that only the larger lid gap 863L can fit over the ridge 860, meaning that the cartridge can only fit in the cell 826 if the cartridge is oriented so that the larger lid gap 863 is aligned with the cartridge lid gap engagement ridge 860. The cartridge lid gap engagement ridge 860 thus also serves for preventing a cartridge from being inserted into cell 826 in any other but the predefined required orientation.

As shown in FIG. 7 and described above, the bridging member 818 serves as a rib to separate cartridge cells $826_4$ and $826_5$. The bridging member 818 has a top edge 864. The bridging member top edge has an essentially cubic-shaped projection 866 centrally mounted thereon, i.e. substantially equidistant from the rack side walls 802 and 804. Thus projection 866 has a substantially square cross section. The uppermost square surface bears a reflective indicia 868, such as reflective white paint. The indicia 868 is detectable by an electronic reader, such as a bar code reader 446.

As also shown in FIG. 7, the side walls 802 and 804 extend a predetermined height H1 above the rack bottom wall interior surface 810B. The uppermost square surface of projection 866 extends to a predetermined height H2 above the rack bottom wall interior surface 810B, which height H2 is essentially the same as a dimension of a standard 8 mm magnetic tape cartridge. The top edge 864 of the bridging member 818 extends a predetermined height H3 above the rack bottom wall interior surface 810B, with height H3 being greater than H1 but less than H2.

The rack 70 has engagement means provided thereon for engaging a mounting member such as the rack support extrusion 76 (see FIGS. 11A and 11B). The engagement means includes four engagement tabs 870 formed on the rack side wall bottom edges 802B and 804B. Two engagement tabs 870 are provided on side wall 802 and two tabs 870 are provided on side wall 804, with all four tabs 870 being located near corners of the rack 70. The tabs 870 on side wall 802 are paired in alignment with the tabs 870 on the side wall 804. The tabs 870 are provided beneath the plane of the rack bottom wall exterior 810A.

Figure 9:
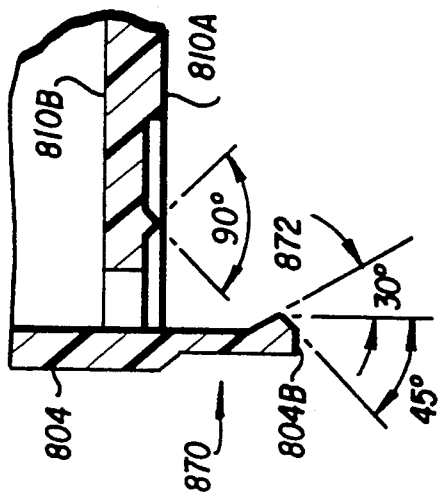
FIG. 9 is a sectioned side view of a portion of a rack mounting tab for the cartridge library system of the embodiment of FIG. 1.

Each of the engagement tabs 870 has a projection 872 provided thereon (see FIGS. 8B and 9). The engagement tab projections 872 of each tab 870 extend interiorly beneath the rack to face the paired projection on the other side wall. The tabs 870 depend from their respective side walls 802, 804 in cantilevered manner, each of said tabs 870 having an interior surface, including the projections 872, which is slightly out of the plane of its respective side wall portion for its side wall. The interior surface of a tab 870 is inclined toward the opposing side wall but resiliently displaceable back into coplanar relationship with the side wall 802 when the rack engages a mounting extrusion 76.

Figure 10:
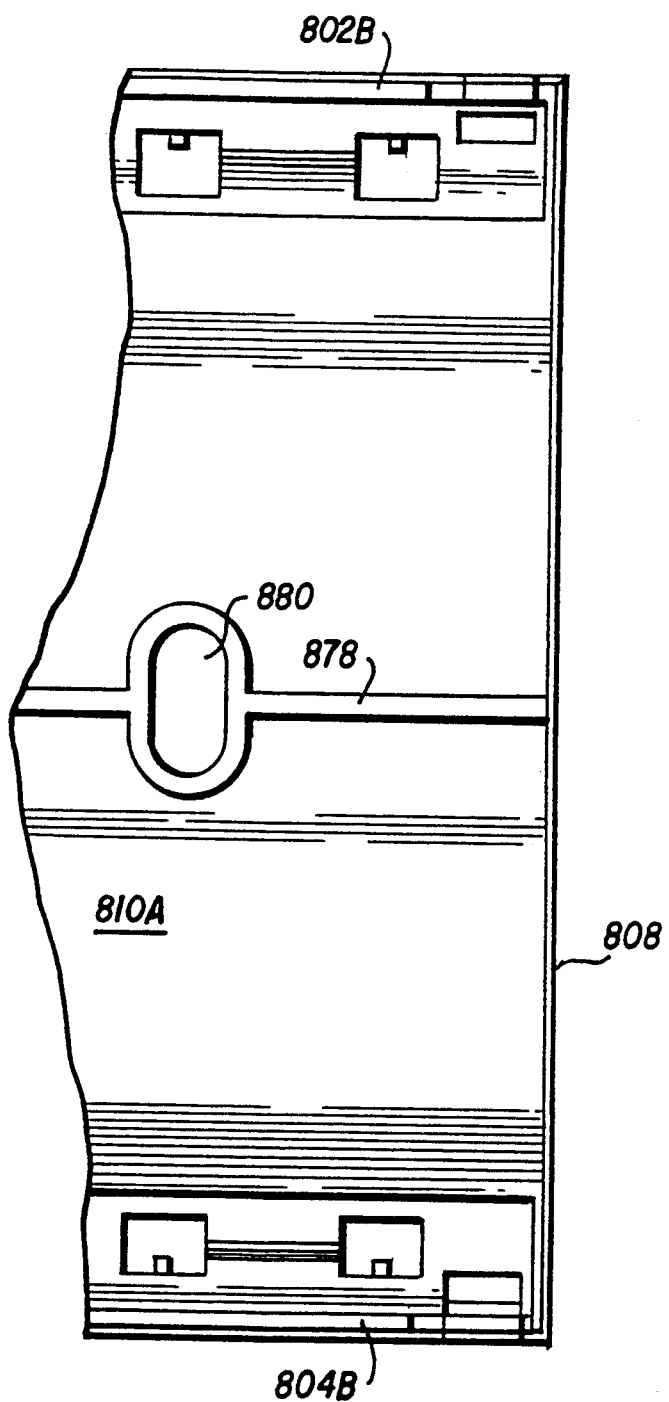
FIG. 10 is a rear view of a portion of a rack for storing a plurality of cartridges for the cartridge library system of the embodiment of FIG. 1, and particularly showing rack orientation guidance means provided on the rack.

As shown in FIGS. 7, 8A, and 10, the rack bottom wall exterior surface 810B has a beam 878 which runs substantially across the rack 70 from end wall 806 to end wall 808. As shown in FIG. 8A, the bottom beam 878 is slightly off-center, being closer to rack side wall 802 than to rack side wall 804. Near the end wall 808 the bottom beam 878 is briefly configured into an oval shape to form a female receptacle 880 (see FIG. 10). This female receptacle 880 serves as orientation guidance means when the rack 70 is being mounted on a member such as the rack mounting extrusion 76 of FIGS. 11A and 11B.

The rack mounting extrusion 76 is an elongated metallic member having the edge profile shown in FIG. 11B. A backside 888 of the extrusion 76 is configured to lie flat against a mounting surface, such as wall 51 of the cartridge library 20. In this regard, apertures 889, of which only one is shown in FIGS. 11A and 11B, are provided in the extrusion 76 to accommodate wall fasteners.

The edges 890 of the extrusion 76 are curled frontwardly to form ridges 892. The extrusion 76 is profiled to include a pair of interior support ridges 894 on a frontside 895 thereof.

An orientation guide 896 is formed on the extrusion frontside 895. The orientation guide 896 is a male member having an essentially oval shape. The orientation guide 896 is shaped, sized, and located to be received by the female receptacle 880 (see FIG. 10) on rack 70 when a rack 70 is mounted onto the extrusion 76.

When a rack 70 is mounted onto extrusion 76, the rack 70 must have a predetermined orientation in order for the female receptacle 880 of the rack 70 to properly fit over the male orientation guide 896 of the extrusion 76. The engagement tabs 870 of the rack 70, being resilient, are deflected underneath the rack 70 by the mounting ridges 892 of the extrusion 76. The mounting tabs 870 of the rack thereafter bear outwardly against the mounting ridges 892 to keep the rack 70 securely mounted on the extrusion 76.

OPERATION: CARTRIDGE TRANSPORT

Figure 19C:
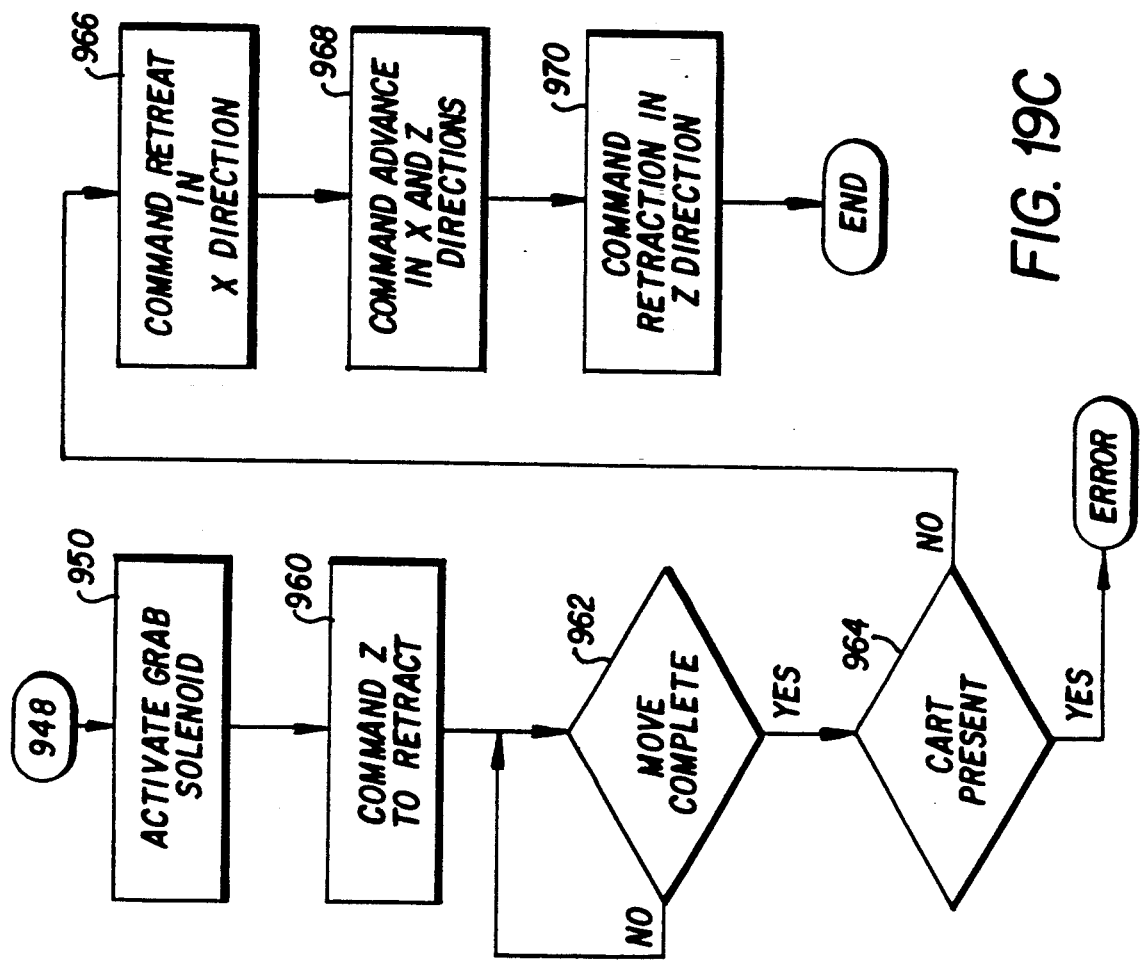
FIGS. 19A-19C are schematic views showing operating steps executed by the cartridge library system of the embodiment of FIG. 1 in transporting a cartridge from a source cell to a target drive.
Figure 19A:
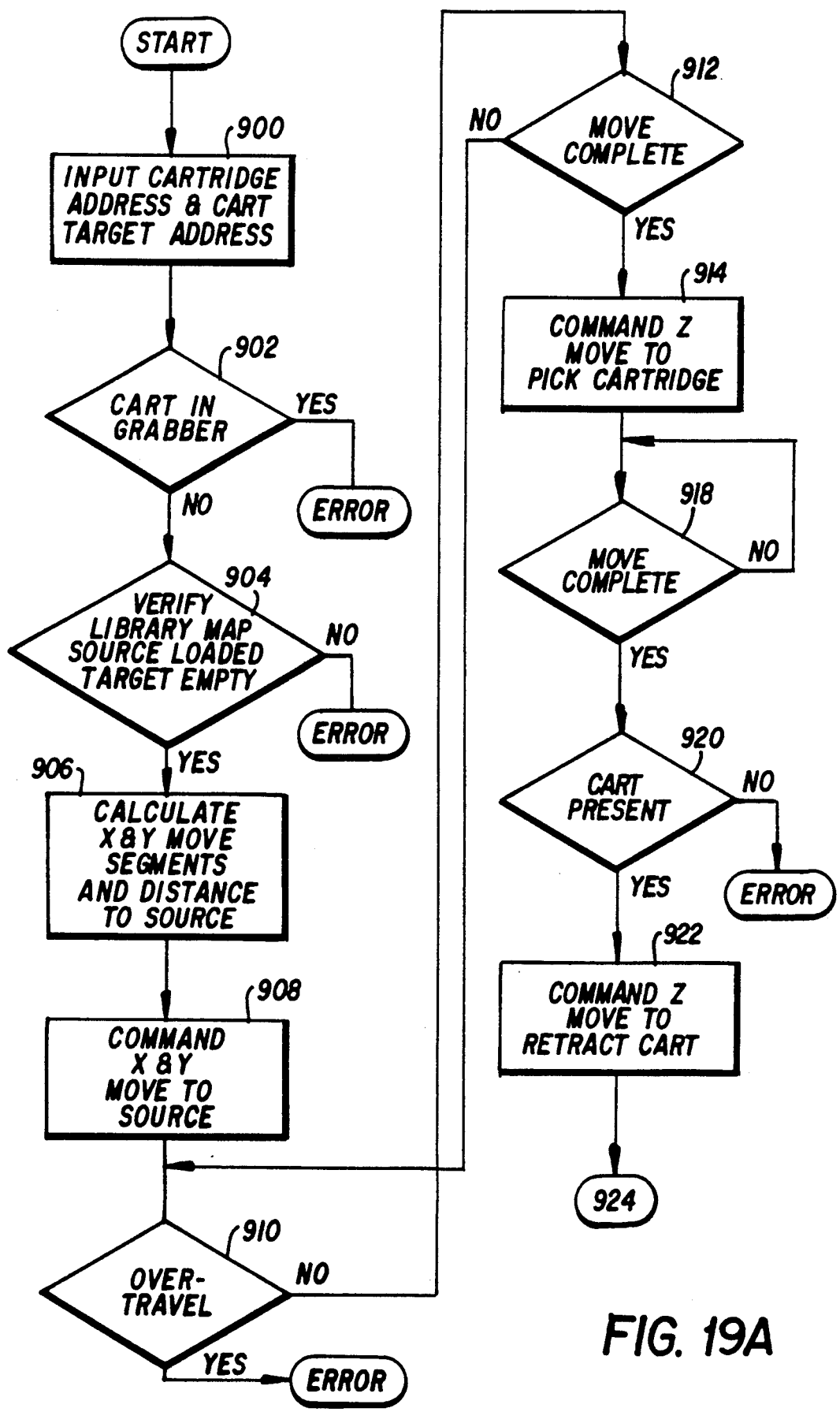
Figure 19B:
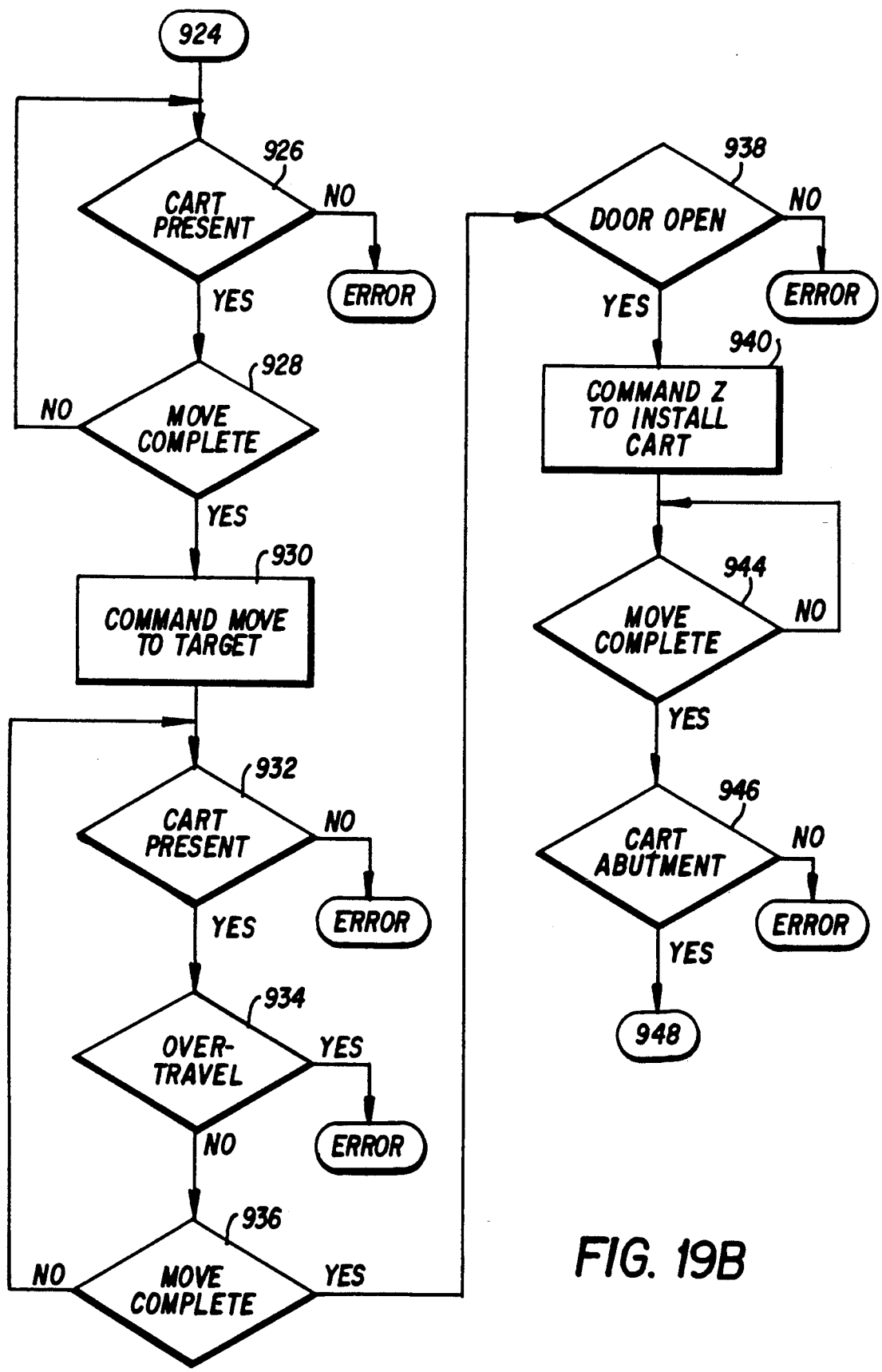

FIGS. 19A–19C show steps executed by the cartridge library system of the invention in engaging a cartridge 520 from a source cell (in one of the racks 70 provided on wall 51 of the library system), and transporting that cartridge 520 to a target tape drive 56. From the ensuing discussion it should also be understood how the cartridge transport assembly 100 of the library transports a cartridge from one non-drive cell to another; and from a drive 56 to a target non-drive cell included in one of the racks 70.

In order to fetch a cartridge from a source cell, X, Y, and Z coordinates of the source cell must be obtained from the library map stored in SRAM, 614. Likewise, the X, Y, and Z coordinates of the target cell for the cartridge must also be obtained from the library map. At step 900 (see FIG. 19A) these coordinates are transferred to the electronic three axis control board 626.

At step 902 the library CPU, 610 checks to determine if a cartridge is presently engaged by the cartridge transport assembly 100. If the result of the check at step 902 is positive, an error message is generated. At step 904 the library CPU, 610 checks to determine if the target cell is already occupied. An error message is generated if the target drive 56 is already occupied.

At step 906 the three axis control board 626 calculates the X and Y components of travel required for the cartridge transport assembly 100 to reach the selected source cell. At step 908 the three axis control board 626, via the interconnect board 628, sends signals to the X-drive motor 254 and to the Y-drive motor 118 via the INPORT 640 so that the cartridge transport assembly 100 is maneuvered to appropriate X and Y coordinates of the source cell. In this respect, the signals to the Y-drive motor 118 cause the Y-drive belt assembly 116 to displace the Y-carriage 112 to the proper Y coordinate for the source cell. Likewise, the signals to the X-drive motor 254 cause the X-drive belt assembly 252 to displace the X-carriage 248 to the proper X coordinate for the source cell. Via the microprocessor 610 and the quadrature decoder and differential receiver section 632, the microprocessor 610 and the three axis control board 626 keep abreast of the degree of motion of the X and Y displacement systems 104 and 106, respectively, by the tach signals received from respective tachometers 278 and 148.

Step 910 reflects the fact that any overtravel by the X-carriage 248 or the Y-carriage 112 during step 908 results in an interrupt and an error message. That is, should the X-carriage 248 travel so far that the fin carried thereon interrupts beam of sensor 258, the sensor 258 generates an electrical signal (received at INPORT 640) which results in an error message. Alternatively, should the Y-carriage 112 travel so far that the photointerrupter element carried on the Y-carriage 112 interrupts the sensor 122, the sensor 122 generates a signal which is applied through INPORT 640 to ultimately result in an error message.

At step 912 the microprocessor 610 together with the three axis board 626 determines whether the requested travel for the cartridge transport assembly 100 in the X and Y directions has been completed. As mentioned above, the three axis board 626 knows this through the monitoring by the microprocessor 610 of the X and Y tachometers 278 and 148, respectively, via the quadrature decoder and receiver section 632. If the requested move along the X and Y axes is not yet complete, execution continues in loop fashion until it is determined that the move is complete.

At step 914 the three axis control board 626, via the INPORT 640, sends signals to the Z-drive motor 316 so that the cartridge transport assembly 100 is maneuvered to the appropriate Z coordinate of the source cell. In this respect, the signals to the Z-drive motor 316 cause the Z-drive output shaft to rotate, with the rotational motion being transmitted by drive belt 334 to the worm gear 312. Rotation of the worm gear 312 in turn causes displacement of the Z-carriage 318 to the proper Z coordinate for the source cell.

At step 918 the microprocessor 610 in conjunction with the three axis board 626 determines whether the requested travel for the cartridge transport assembly 100 in the Z direction has been completed. As mentioned above, the microprocessor 610 and the three axis board 626 know this through the monitoring Z tachometer 352 (via the quadrature decoder and receiver section 632). If the requested move along the Z axis is not yet complete, execution continues in loop fashion until it is determined that the move is complete.

Figure 17B:
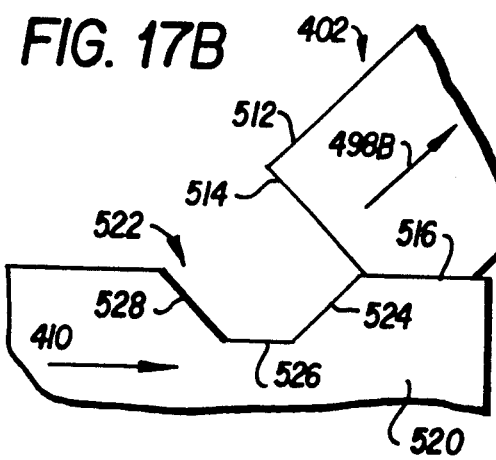
Figure 17C:
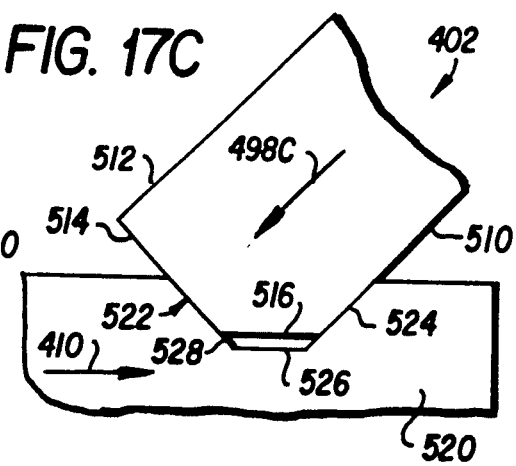

By the time that the move of the cartridge transport assembly 100 is complete in the Z direction, the conditions depicted in FIGS. 17A through 17C will have occurred. In this regard, as the cartridge transport assembly 100 travels toward the cartridge in the source cell, the cartridge transport assembly 100 sees the cartridge approaching in the direction depicted as arrow 410 (see FIGS. 4 and 17A).

Initial contact of one of the engagement fingers 402 is shown in FIG. 17A, wherein the finger third surface 514 strikes an edge of the approaching cartridge. As the approach of the cartridge continues along direction 410, the edge of the cartridge exerts a force in direction 410 against the engagement finger 402. Although the engagement finger 402 is resiliently biased against the cartridge by the action of torsion spring 499, the force exerted by the cartridge overcomes the finger bias, so that the engagement finger 402 begins to move along the guide slot 493 in the direction shown by arrow 498A in FIG. 17A. Simultaneously, the finger third surface 514 rides higher and higher on the cartridge edge.

As the cartridge continues to approach as shown in FIG. 17B, the retraction of the engagement finger 402 occurs to such a degree that the finger third surface 514 rides sufficiently high that the finger fourth surface 516 starts to ride on the cartridge edge. While the finger surface 516 rides on the cartridge in this manner, the cartridge maintains its force on the engagement finger 402.

When the intersection of the finger first and fourth surfaces 510 and 516 reach the cartridge notch first surfaces 524, the resilient bias of the engagement finger 402 (afforded by the torsion spring 499) exerts a force (shown by arrow 498C) which drives the engagement finger down into the cartridge changer grip notch 522 as shown in FIG. 17C. At this juncture, the finger first surface 510 is flush against the cartridge notch first surface 524, and the finger second surface 512 is flush against the cartridge notch second third surface 528. The flush contact of these surfaces causes secure engagement of the finger 402 with the cartridge. The cartridge is essentially locked between the fingers 402A and 402B without the need of further locking mechanisms. In this regard, as understood with reference to FIG. 17D, should the cartridge be jarred or displaced further along the direction 410, the finger 402 remains inserted in the cartridge notch 522.

FIG. 5A shows the appearance of the cartridge transport assembly 100 when a cartridge is engaged between engagement fingers 402 in the stage described in FIG. 17C. Upon engagement of the cartridge between the fingers 402, a small gap G exists between a foremost edge E of the cartridge and the cartridge reference surface 419 provided on the cartridge transport assembly 100. The edge E of the cartridge bears against the plunger 438, with the result that the plunger 438 is retracted to such an extent that the blockage fin 442 of the travelling interrupter element 440 obstructs beam 432 of the cartridge engagement sensor 408.

Returning to FIG. 19A, at step 920 a check is made to determine whether the cartridge engagement sensor 408 is sending a signal indicative of the engagement of a cartridge in the aforedescribed manner. If, at this juncture, such a signal is not received from the cartridge engagement sensor 408, an error message is generated.

Assuming that a cartridge has been successfully engaged between the fingers 402 of the cartridge transport assembly 100 in the manner described above, at step 922 the three axis control board 626 directs the cartridge transport assembly 100 to return to its "home" position. In this regard, the control board 626 sends signals to the Z motor 316 (in the manner described above) so that the Z-carriage 318 returns to its home position.

As the Z-carriage 318 of the cartridge transport assembly 100 returns home, the signal from the cartridge engagement sensor 408 is continually monitored (as reflected by step 926) to ensure that the cartridge is still engaged between the fingers 402. When the microprocessor 610 and the three axis control board 626 determine that Z-carriage 318 has finally returned home (at step 928), the board 626, knowing the X, Y, Z coordinates of the target drive 56, directs the cartridge transport assembly 100 with the cartridge engaged thereby to move to the target drive 56 (step 930).

The movement of the cartridge transport assembly 100 along the X and Y axes involves execution of steps 934 and 936, which are understood with reference to the earlier discussion of steps 910 and 912. Additionally, step 932 reflects the fact that the presence of the cartridge between the engagement fingers 402 is constantly monitored in the fashion described above with reference to step 926.

After the cartridge transport assembly 100 has reached the X and Y coordinates of the target drive 56, a check is again made to ensure that the drive door 60 is opened (step 938). If the drive door 60 is open, the three axis control board 626 directs the Z-carriage 318 to move toward the target drive (step 940, see also FIG. 18A). Movement of the Z-carriage with the cartridge transport assembly 100 mounted thereon continues until the microprocessor 610 in conjunction with the three axis control board 626 determines that travel is completed (step 944).

When the cartridge carried by the cartridge transport assembly 100 reaches the target drive (as determined in step 944), contact by the cartridge with the cartridge-receiving cell 58 of the drive 56 (see FIG. 18B) causes the cartridge to exert a further force in the direction of arrow 410 against the cartridge transport assembly 100. This exertion of further force causes the cartridge 520 and the cartridge transport assembly 100 to press directly against the cartridge reference surface 419, so that the gap G is eliminated and the plunger 438 is further retracted in the direction of arrow 410.

Figure 17D:
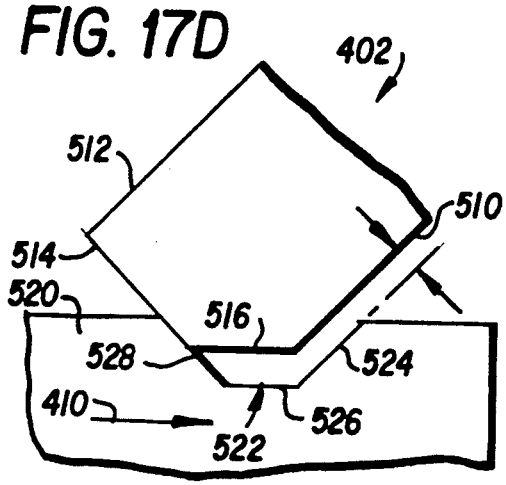

The relative positions of the engagement finger 402 and the cartridge notch 522 at this juncture are shown in FIG. 17D. FIG. 17D shows that the additional force exerted in the direction of arrow 410 causes the finger third surface 514 to ride up a predetermined amount on the notch third surface 522, the predetermined amount being such that the finger third surface 514 still contacts, and hence the finger 402 remains inserted in, the cartridge notch 522. Since the cartridge edge E is, at this juncture, flush against the cartridge reference surface 419, the finger third surface 514 cannot ride any higher on the notch third surface 522 than is shown in FIG. 17D, since the cartridge 520 cannot advance any further in the direction depicted by arrow 410.

The retraction of the plunger 438 causes the blockage fin 444 carried by the travelling interrupter element 440 to interrupt the beam 434 of the cartridge abutment sensor 409. Thus, the sensor 409 serves to detect a change of a predetermined magnitude in the size of the gap G. The sensor 409 generates a signal, indicative of interruption, and applies the signal via SWITCH PORT 644 to microprocessor 610. The microprocessor 610 monitors for this signal and, when the signal is received (step 946), sends (via IN PORT 640) a signal to the solenoids 404A and 404B (step 950) so that the cartridge transport assembly 400 will release the cartridge 520.

Figure 17E:
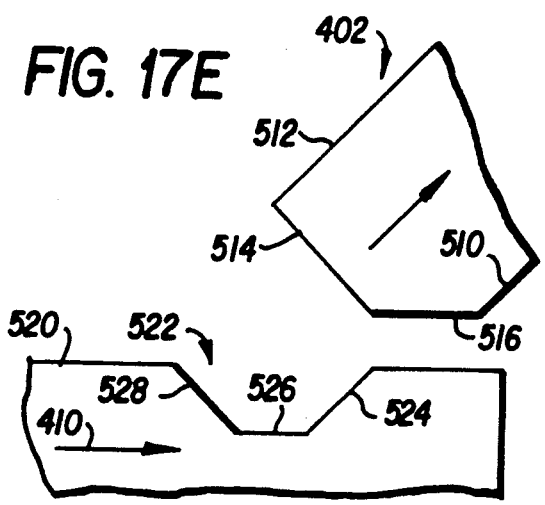

When activated at step 950, the solenoids 404A and 404B retract their plungers 501A and 501B, respectively. Retraction of the plungers 501 causes the pivoting linkage members 503 to pivot about their mounting posts 504. In this respect, linkage member 503A pivots in a clockwise sense about post 504A while linkage member 503B pivots in a counter-clockwise sense about post 504B. As the linkage members 503 pivot, the projections 505 provided thereon which extend into the engagement fingers 402 cause the engagement fingers 402 to retract in the finger slots 493 away from the cartridge 520. Retraction of the engagement fingers 402 is shown in FIG. 17E.

After the cartridge 520 is released from the cartridge transport assembly 100 and into the target drive 56 in the aforedescribed manner at step 950, the microprocessor 610, via the three axis control board 626, directs the cartridge transport assembly 100 to close the door 60 for the target drive 56. In this regard, at step 960 the microprocessor 610 and board 626 direct the cartridge transport assembly 100 to return to its "home" Z position and wait until it determines that the return is complete (step 962). A check is made at step 964 to determine if a cartridge is still untimely engaged by the cartridge transport assembly 100. This is accomplished by checking the status of the signal from the cartridge engagement sensor 408.

After the cartridge transport assembly 100 has returned to its Z "home" position, at step 966 the microprocessor 610 (working through the three axis control board 626) directs the X-carriage 248 of the assembly 100 to retreat a slight amount along the direction, i.e. to move slightly rightward as shown in FIG. 18D. Thereafter, at step 968, as shown in FIG. 18E, the microprocessor 610 via the three axis control board 626 directs the cartridge transport assembly 100 to advance predetermined amounts in the X and Z directions, so that the ram heads 450 contact the drive door 60. After contact, continued predetermined advancement of the door rams 450 in the X and Z direction (shown in FIG. 18F) eventually closes the drive door 60 (see FIG. 18G). After the door 60 is closed, the microprocessor 610 via the three axis control board 626 directs the cartridge transport assembly 100 to again retract the Z-home position (step 970) in a manner understood in light of the foregoing discussion.

It should be understood that in the aforedescribed steps 966, 968, and 970, any overtravel detected by the sensor 258 would result in an error message upon such overtravel.

From the foregoing discussion it is also understood how the cartridge transport assembly 100 can move a cartridge 520 from a cell of one rack 70 to another cell of another rack, or from a source tape drive 56 to a target cell in a rack 70.

The cartridge transport assembly 100 advantageously includes the engagement fingers 402A, 402B, which not only engage cartridges 520, but lock the cartridges 520 between the fingers 402A, 402B without the requirement for additional locking structure. Moreover, the engagement fingers 402A, 402B are carried by door rams 450A, 450B, which dually serve both as linkage members for disengaging the fingers 402A, 402B and as rams for closing the door 60 of a tape drive 56.

OPERATION: LIBRARY INVENTORY

After any opening of the door 26 of the cartridge library 22, the microprocessor 610 must assume that cartridges were manually changed, added, or taken away from the library while the door was open. In this respect, cartridges may have been inserted into one or more empty cells 826 (or fixed cartridge holders 78), or taken out of cells 826 or holders 78 (thereby leaving the cell(s) 826 or holder(s) 78 empty). Alternatively, cartridges may have been manually switched between one or more cells 826 or holders 78.

Moreover, it is possible that the user may reconfigured the library to have more or less drives 56. For example, a user having less than three drives 56 in a library 20 might add an additional drive, such as fourth drive 56D.

Accordingly, after each opening and closing of the library door 26, the microprocessor 610 must update the data look-up table stored in SRAM 614 (see FIGS. 12A, 12B, and 12C) with respect to locations and identities of the cartridges. In this respect, the data look-up table, also known as the library map, stores four values for each of 110 potential cartridges in the eleven racks 70 and for each of the six potential cartridges in the fixed cartridge locations 78. These values include a value indicative of a bar code value appearing on a label of the cartridge, and the X, Y, and Z coordinates of the cartridge. In addition, the microprocessor 610 must determine how many drives 56 are currently included in the library 20.

Figure 16A:
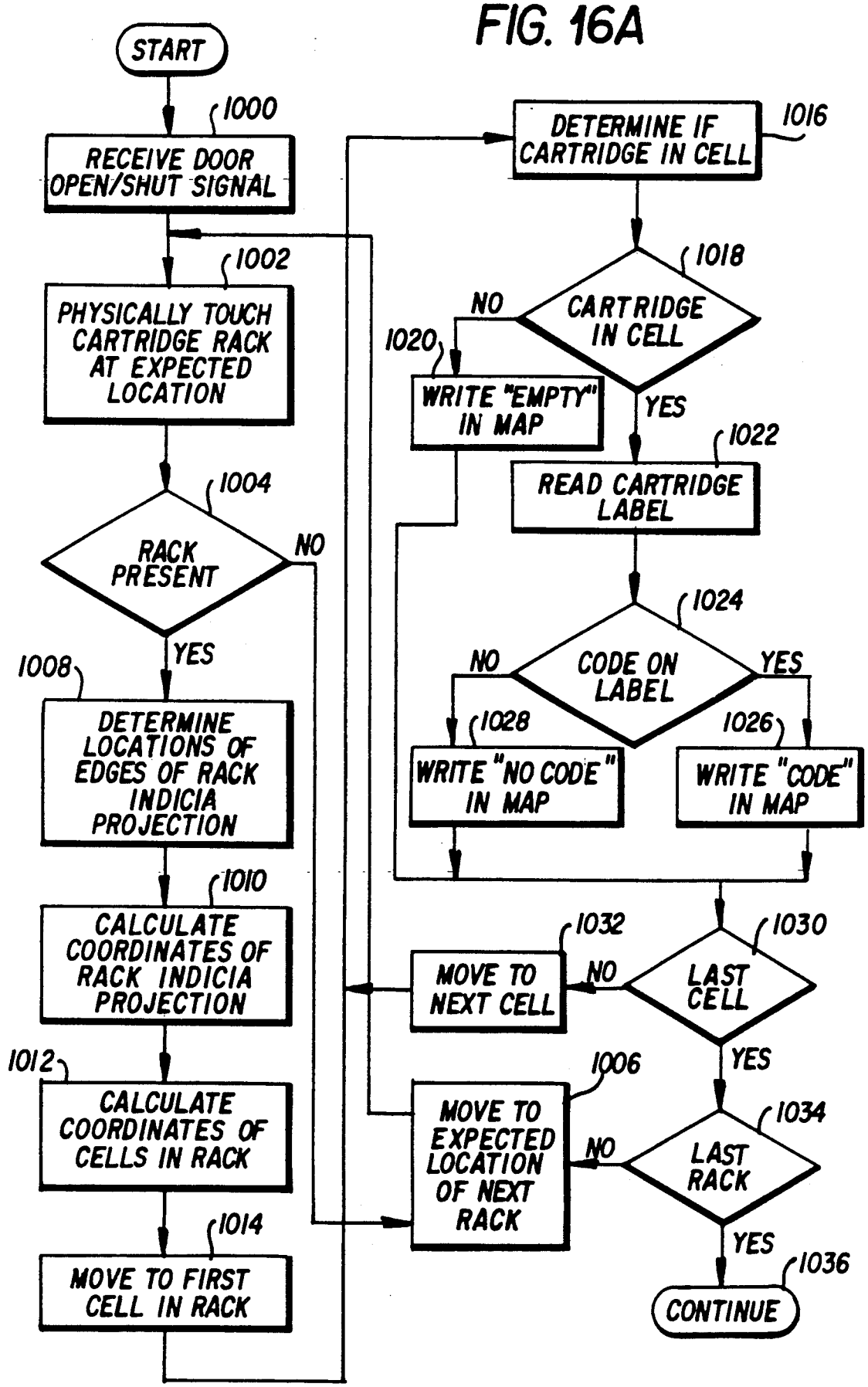
FIGS. 16A-16B are schematic views showing operating steps executed by the cartridge library system of the embodiment of FIG. 1 in a library inventory procedure.
Figure 16B:
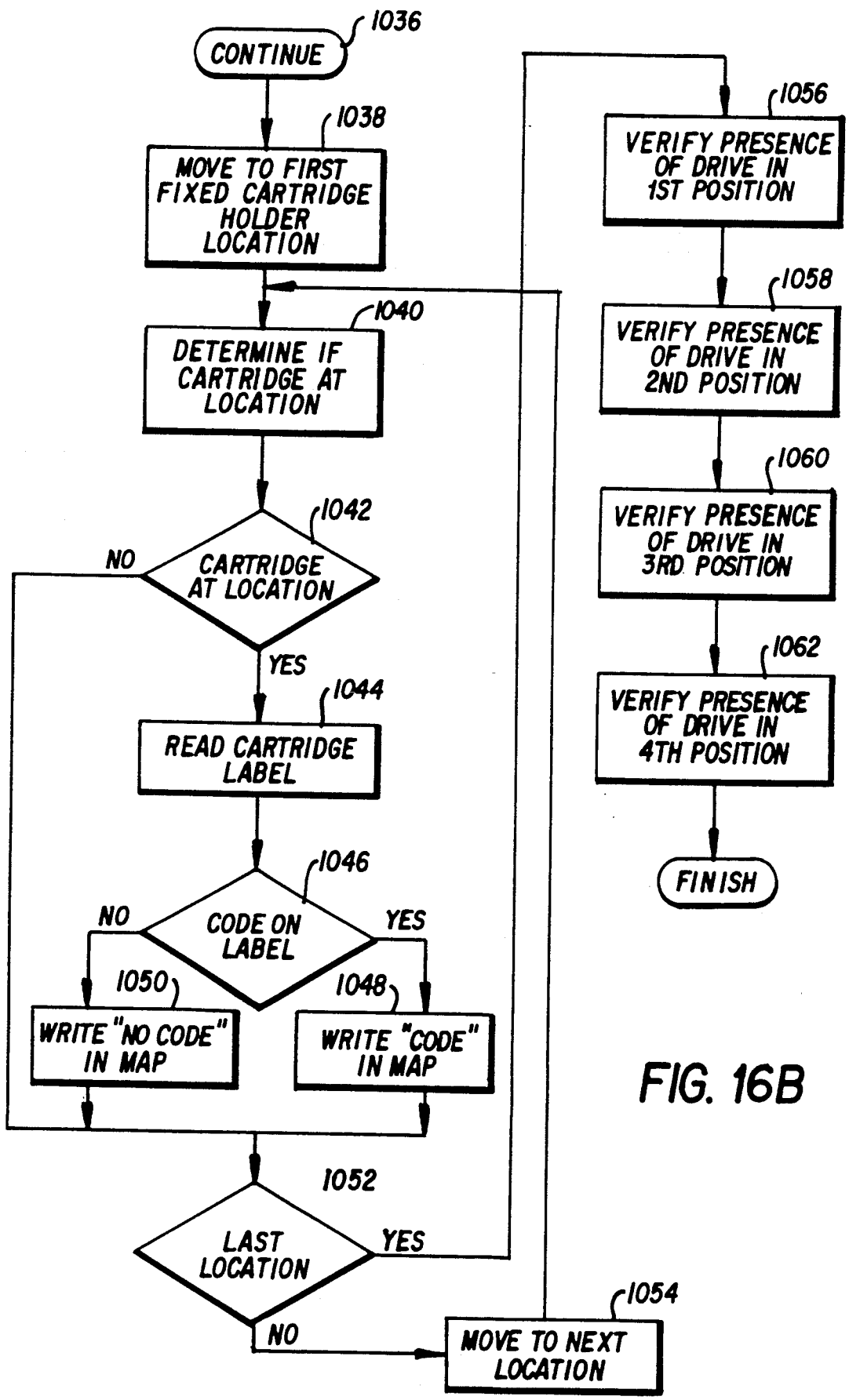

FIGS. 16A–16B show steps executed by the microprocessor 610 in the inventory procedure which occurs after each opening and closing of the library door 26. Opening and subsequent closing of the door 26 is detected by the door close sensor 81, which applies a signal (at step 1000) through the INPORT 640, to the library computer 22. After receipt of the signal from the door close sensor 81, the microprocessor 610 directs commencement of seriatim examination of expected cartridge locations.

Upon commencement of the inventory procedure, the microprocessor has access to certain values permanently stored in ROM 616. Among these values are initialization X, Y, and Z coordinates of expected positions of the projections 866 provided on each of the eleven potential racks 70 storable in the cartridge library 20, as well as the permanent values for the X, Y, and Z coordinates for four drives 56 and the six fixed position cartridge holders 78.

At step 1002 the cartridge transport assembly 100 moves to the expected X, Y, and Z coordinates of a projection 866 for a rack 70. In this respect, the microprocessor 610 causes the initialized X, Y, and Z values for these coordinates to be read from ROM 616 and applied to the three axis control board 626. The preceding discussion of the engagement of a cartridge by the transport assembly 100 explains how the three axis control board 626 communicates through the INPORT 640 to the X-motor 254, the Y-motor 118, and the Z-motor 316 for directing these motors to displace their respective carriages, and thus displace the cartridge transport assembly 100.

In the above regard, at step 1002 the cartridge transport assembly 100 is directed sufficiently far along the Z direction (the direction of arrow 410) for the plunger 438 to physically contact a rack 70 at the suspected location, if a rack be there. At step 1004 the microprocessor 610 expects to receive a signal from either the cartridge engagement sensor 408 or the cartridge engagement sensor 409 indicating that the plunger 438 has been forced to retract. Retraction of the plunger 438 indicates to the microprocessor that the plunger 438 has encountered a rack 70 at the suspected location.

If a rack 70 is not present at the location examined at step 1002, and assuming the location examined was not for the eleventh rack, at step 1006 the cartridge transport assembly 100 is moved to the suspected X, Y, and Z coordinates of the next rack 70, as expected by the initialization values of that rack stored in ROM 616.

When it is confirmed at step 1004 that a rack is physically present at the suspected location, the microprocessor 610 seeks to determine the precise location of the center of the rack 70. As a preparatory step in this regard, at step 1008 the microprocessor 610 first seeks to locate the edges of the square indicia projection 866 which surmounts the cartridge rack 70 (see FIG. 7). To this end, the microprocessor 610 requests that the bar code reader 446 in plunger 438 scan the suspected location and determine the location of the four edges of the square projection 866. Since the projection 866 has a white reflective indicia provided on the square upper surface thereof, the reflective optical sensor 670 of the bar code reader 446 determines the positions of sharp contrasts that occur at the edges of the projection 866.

In connection with step 1008 and the determination of the locations of the edges of the indicia, as the bar code reader 446 moves through a range of positions in the suspected location data is stored in a special buffer. The data stored in the buffer is an ordered pair consisting of the coordinates of each position and the amplitude of the signal received from the bar code reader 446 for each position. After the bar code reader 446 has scanned a neighborhood of the suspected location, the microprocessor 610, which has access to this special buffer, determines (with respect to the X axis and Y axis) the minimum and maximum amplitudes for the neighborhood. The microprocessor 610 further determines positions along the X and Y axes at which the measured amplitude is 80 percent of the maximum amplitude. With respect to the X axis and the Y axis the microprocessor 610 designates the coordinates having 80 percent amplitude as being edges of the indicia projection 866.

Knowing the coordinates of the edges of the white indicia projection 866 of the rack 70, at step 1010 the microprocessor 610 calculates the precise center coordinates of the projection 866, and thus of the rack 70. The calculation of the center of the indicia projection 866 is an averaging of the two coordinates of the X axis and the two coordinates of the Y axis that have 80 percent amplitude.

The ROM 616 has stored therein values indicative of the spacing or offset of each cell in a standard rack 70 relative to the rack center. Thus, having calculated the precise center coordinates of the rack 70, and having values indicative of the cell offsets in ROM 616, the microprocessor 610 is able at step 1012 to calculate the precise X, Y, and Z coordinates of each cell in the rack 70.

Having calculated the precise X, Y, and Z coordinates of each of the cells 826 in a rack 70, at step 1014 the microprocessor 610 directs the cartridge transport assembly 100 to move to the coordinates of a first cell 826 in the rack 70. Then at step 1016, the microprocessor 610 directs the transport assembly 100 to verify that a cartridge is present in the cell 826 by physically contacting the cartridge. The physical contact of the cartridge at step 1016 is accomplished much in the manner of the physical contact of the rack projection 866 at step 1002.

If it is determined at step 1018 that a cartridge is not in the cell, at step 1020 the microprocessor directs that an "empty" indication be provided in the look-up table of SRAM 614 for this cell. Assuming that the physical presence of a cartridge has been verified in the cell, the microprocessor 610 directs that the label of the cartridge be read (at step 1022). In order to accomplish the reading of the cartridge label, the transport assembly 100 is displaced in the Y direction so that the bar code reader 446 can scan the label.

As the bar code reader 446 scans the cartridge, and if a bar code label is provided on the cartridge, analog signals indicative of a bar code pattern are generated by the optical reflective sensor 670 of circuit 448. The analog signals of circuit 448 are transformed to digital signals by the conditioning circuit of FIG. 13. As understood from the preceding description of FIG. 13, interrupts are applied on line 689 to pin 2 of microprocessor 610 with the leading edge and trailing edge of each digital pulse. Using these interrupts, the microprocessor 610 determines at step 1024 that the cartridge does have a bar code label, and analyzes the pulse widths of the digital signal to determine a bar code value. At step 1026 the bar code value is stored for the cartridge having the current X, Y, and Z coordinates in the map in SRAM 614.

Had the microprocessor 610 determined at step 1024 that the cartridge did not have a bar code, the microprocessor 610 would direct at step 1028 that a "no code" indication be stored in SRAM 614 for the cartridge having the current X, Y, and Z coordinates.

After the microprocessor stores either a "no code" or bar code indication in the SRAM 614, at step 1030 the microprocessor determines whether steps 1016 through 1028 have been executed for all cells in the rack 70. If all cells have not been inventoried for this rack in the above-described manner, at step 1032 the microprocessor 610 directs that the cartridge transport assembly 100 to move to the coordinates of the next cell and that steps 1016 through 1028 to be executed for that next cell.

If all cells have been inventoried, the microprocessor 610 checks at step 1034 to determine whether all racks 70 have been inventoried. If all racks 70 have not been inventoried, the microprocessor 610 returns to step 1006 to direct that the cartridge transport assembly 100 move to the expected location of the next rack and that the above-described inventory procedure be implemented for each cell in the remaining rack. After all racks 70 have been thusly inventoried, processing continues (as indicated by symbol 1036) with the inventory of the fixed cartridge holders 78 as described in FIG. 16B.

In the inventory procedure for the fixed position cartridge holders 78, the physical presence of cartridges must be verified and bar code labels read. The precise coordinates of the holders 78 are permanent, and values therefor are stored in the ROM 616. Accordingly, comparable operations such as the preceding steps 1002 through 1012 need not be performed for the fixed location cartridge holders 78.

At step 1038 the microprocessor 610 directs that the cartridge transport assembly 100 move to the coordinates of the first fixed location cartridge holder 78. At step 1040 the cartridge transport assembly 100 moves along the Z axis in an effort to physically contact a cartridge, if any, in the fixed location cartridge holder 78. The manner of movement of the transport 100 and the manner of determining whether a cartridge is physically present is understood from the description of an analogous operation at step 1002.

If, at step 102, it is determined that a cartridge is present in the fixed location cartridge holder 78, an attempt is made at step 1044 to read the cartridge label. If it is determined at step 1046 that the cartridge has a bar code, at step 1048 a value indicative of that bar code is stored in the library map of SRAM 614 for the cartridge having the current coordinates of the transport assembly 100. If no bar code is detected, at step 1050 a "no code" indication is stored label in the library map of SRAM 614 for the cartridge having the current coordinates of the transport assembly 100. The execution of steps 1042 through 1050 is understood from the preceding discussion of analogous steps 1016 through 1028.

At step 1052 the microprocessor 610 determines whether all fixed location cartridge holders 78 have been inventoried in the preceding manner. If not, at step 1054 the transport assembly 100 moves to the coordinates of the next fixed location cartridge holder 78, and steps 1040 through 1052 are repeated for the next holder 78.

In addition to taking inventory of the cartridge racks 70 and fixed location cartridge holders 78 in the preceding manner, the inventory procedure of FIG. 16 also counts the number of drives 56 present in the cartridge library 20. In this respect, the ROM 616 is preprogrammed with the precise coordinates of the possible locations of four such drives 56.

In connection with the counting of the drives 56, at step 1056 the microprocessor 610 directs the cartridge transport assembly 100 to move to the known coordinates of the possible location of a first drive 56A. If the plunger 438 of the transport assembly 100 is able to physically contact a drive at its expected location, the microprocessor 610 knows that a drive is currently situated in the first drive position and sets an appropriate flag in the SRAM 614. Similar steps 1058, 1060, and 1062 are executed with respect to possible locations of drives 56B, 56C, and 56D, respectively, with appropriate flags being set in SRAM 614 for each.

Thus, it is seen that the cartridge library 20 of the present invention capitalizes upon uniquely configured and marked racks 70, as well as a bar code-laden plunger 438, to effect mapping of the library data look-up table stored in SRAM 614.

While the invention has been particularly shown and described with reference to the preferred embodiments thereof, it will be understood by those skilled in the art that various alterations in form and detail may be made therein without departing from the spirit and scope of the invention. For example, while the cartridge library 20 has been described in connection with standard 8 mm. magnetic tape cartridges, the invention also encompasses libraries for other sized cartridges, such as 4 mm. cartridges, for example.

The embodiments of the invention in which an exclusive property or privilege is claimed are defined as follows:

1. Apparatus for transporting a unit of a information storage medium, said apparatus comprising:
   a transportable frame;
   contacting means mounted on said frame and positioned to physically contact a unit of information storage medium, the contacting means being translatable through a range of positions in response to the displacement of a unit of information storage medium;
   means for sensing the translation of said contacting means through at least one of said positions and for generating a signal indicative of the location of said unit of information storage medium relative to a reference point on said frame; and,
   reading means for reading an indicia provided on said unit of information storage medium, at least a portion of said reading means being internally mounted in said contacting means.

2. Apparatus for transporting a unit of a information storage medium, said apparatus comprising:
   a transportable frame;
   contacting means mounted on said frame and positioned to physically contact a unit of information storage medium, said contacting means being resiliently biased to bear against said unit of information storage medium; and,
   reading means for reading an indicia provided on said unit of information storage medium, at least a portion of said reading means being internally mounted in said contacting means.

3. The apparatus of claim 2, wherein said contacting means is a resiliently-biased plunger which bears against said unit of information storage medium.

4. Apparatus for transporting a unit of a information storage medium, said apparatus comprising:

a transportable frame, said frame including a reference surface in which an aperture is provided;

contacting means mounted on said frame and positioned to physically contact a unit of information storage medium, wherein said contacting means at least partially extends through said aperture in said reference surface; and, reading means for reading an indicia provided on said unit of information storage medium, at least a portion of said reading means being internally mounted in said contacting means.

5. The apparatus of claim 4, further comprising engagement fingers mounted upon said frame for selectively engaging and disengaging said unit of information storage medium, and wherein said aperture is positioned intermediate said engagement fingers.

6. The apparatus of claim 2, further comprising engagement means mounted upon said frame for selectively engaging and disengaging said unit of information storage medium, wherein said engagement means comprises a pair of engagement fingers, and wherein said apparatus further comprises actuator means mounted on said frame for selectively moving said engagement fingers into engaging and disengaging relationship with said unit of information storage medium.

7. Apparatus for transporting a cartridge stored in a library, said apparatus comprising:

a transportable frame;

plunger means mounted on said frame and resiliently biased to physically contact a cartridge; and, reading means for reading an indicia provided on said cartridge, at least a portion of said reading means being internally mounted in said plunger means.

8. The apparatus of claim 7, wherein said frame includes a reference surface in which an aperture is provided.

9. The apparatus of claim 8, wherein said plunger means at least partially extends through said aperture in said reference surface.

10. The apparatus of claim 7, wherein said reading means is a bar code reader.

11. The apparatus of claim 7, wherein said cartridge is a magnetic tape cartridge.

12. A library system wherein a plurality of information storage medium units are stored, said library system comprising:

a drive for at least reading information from said information storage medium units when a unit is loaded into said drive;

a plurality of racks, each of said racks having a plurality of cells therein for storing said units, each of said racks having a detectable indicia thereon;

means for mounting said plurality of racks according to a predefined organization;

unit transport means comprising:

a transport frame;

contacting means mounted on said frame and positioned to physically contact a unit; and, reading means mounted for reading indicia provided on said units of information storage medium and for detecting said indicia on said racks, at least a portion of said reading means being internally mounted in said contacting means;

displacement means for displacing said unit transport means whereby said transport means transports said cartridges between said cells in said racks and said drive.

13. The apparatus of claim 12, wherein said contacting means is translatable in response to the displacement of a unit of information storage medium engaged by said engagement means.

14. The apparatus of claim 13, wherein said contacting means is translatable through a range of positions, and wherein said apparatus further comprises means for sensing the translation of said contacting means through at least one of said positions and for generating a signal indicative of the location of said unit of information storage medium relative to a reference point on said frame.

15. The apparatus of claim 13, wherein said contacting means is resiliently biased to bear against said unit of information storage medium.

16. The apparatus of claim 12, wherein said contacting means is a resiliently-biased plunger which bears against said unit of information storage medium.

17. The apparatus of claim 12, wherein said engagement means comprises a pair of engagement fingers, and wherein said frame includes a reference surface in which an aperture is provided.

18. The apparatus of claim 17, wherein said contacting means at least partially extends through said aperture in said reference surface.

19. The apparatus of claim 18, wherein said aperture is positioned intermediate said engagement fingers.

20. The apparatus of claim 12, wherein said engagement means comprises a pair of engagement fingers, and wherein said apparatus further comprises actuator means mounted on said frame for selectively moving said engagement fingers into engaging and disengaging relationship with said unit of information storage medium.

21. The apparatus of claim 12, wherein said unit of information storage medium is a magnetic tape cartridge.

22. The apparatus of claim 12, wherein each of said racks comprises:

two essentially parallel side walls and a bottom wall, said two side walls extending above said bottom wall by a first predetermined distance;

rib means attached at least to said side walls for partitioning said rack into cells for accommodating said plurality of cartridges;

bridging means connecting said two parallel side walls, said bridging means being essentially orthogonal to said side walls; and, a projection carried on said bridging means, said projection extending above said bottom wall by a second predetermined distance, said second predetermined distance being greater than said first predetermined distance, said projection having a detectable indicia thereon.

23. The apparatus of claim 22, wherein said second predetermined distance is essentially equal to a dimension of said cartridge.

24. The apparatus of claim 22, wherein said bridging means forms a partition between two adjacent cells.

25. The apparatus of claim 22, wherein said bridging means extends above said bottom wall by a third predetermined distance, said third predetermined distance being greater than said first predetermined distance but less than said second predetermined distance.

26. The apparatus of claim 22, further comprising to opposed end walls which are essentially orthogonal to said side walls, and wherein said bridging means is 27. The apparatus of claim 22, wherein said projection has an essentially square cross section.

28. The apparatus of claim 27, wherein said projection is situated substantially equidistant from said side walls.

29. The apparatus of claim 22, wherein said indicia is formed with a reflective medium.

30. The apparatus of claim 22, further comprising means to retain each of said cartridges in said cells.

31. A method of operating a library system wherein a plurality of information storage medium units are stored, said library system being of the type having a transport assembly for engaging and transporting said information storage medium units, said method comprising:
  providing a plurality of racks, each of said racks having a plurality of cells therein for storing said units, each of said racks having a detectable indicia thereon;
  verifying the physical presence in said library system of each of said racks;
  detecting indicia on each of said racks and using said detection of indicia to determine a set of reference coordinates for each of said racks;
  determining a set of coordinates for each of said cells included in each of said racks;
  storing in a memory said set of coordinates for each of said cells included in each of said racks;
  verifying the physical presence of units in each of said cells in said racks;
  reading an indicia provided on units in cells of said racks which have units physically present therein; and,
  storing in said memory a value indicative of said unit indicia for those units which have indicia provided thereon 32. The method of claim 31, wherein the steps of verifying the physical presence of said racks and said units includes physically contacting said racks and said units with said transport assembly.

33. The method of claim 32, wherein the steps of verifying the physical presence of said racks and said units includes physically contacting said racks and said units with a plunger included in said transport assembly.

34. The method of claim 33, wherein said steps of detecting said indicia on said racks and reading said indicia on said units involves using reading means mounted on said plunger.

35. The method of claim 31, wherein said step of detecting indicia on each of said racks involves locating coordinates of edges of a reference region for each of said racks, and using said edge coordinates to determine a center coordinate for each of said racks.

36. The method of claim 35, wherein said step of detecting indicia on each of said racks involves using reader means mounted on said transport assembly to locate coordinates of edges of a reflective projection provided on each of said racks.

37. The method of claim 31, wherein the step of reading an indicia provided on units involves using reader means mounted on said transport assembly to read said indicia.

38. The method of claim 31, wherein said library system further includes a plurality of drives for at least reading information from said units, and wherein said method further comprises the steps of:
  verifying the physical presence of each of said drives in said library and storing an indication of the presence of said drives in a memory.

39. A method of operating a library system wherein a plurality of information storage medium units are stored, said library system being of the type having a transport assembly for engaging and transporting said information storage medium units, said method comprising:
  providing a plurality of racks, each of said racks having a plurality of cells therein for storing said units, each of said racks having a detectable indicia thereon;
  using a translatable contacting means to physically contact racks included in said library system to verify the physical presence of each of said racks;
  using reading means mounted on said contacting means to detect indicia on each of said racks; and
  using said detecting of indicia to determined a set of reference coordinates for each of said racks whose presence was verified in said library system.

40. The method of claim 39, further comprising
  determining a set of coordinates for each of said cells included in each of said racks;
  storing in a memory said set of coordinates for each of said cells included in each of said racks.

41. The method of claim 40, further comprising:
  verifying the physical presence of units in each of said cells in said racks;
  reading an indicia provided on units in cells of said racks which have units physically present therein; and,
  storing in said memory a value indicative of said unit indicia for those units which have indicia provided thereon.

42. The method of claim 39, wherein said step of detecting indicia on each of said rack involves locating coordinates of edges of a reference region for each of said racks, and using said edge coordinates to determine a center coordinate for each of said racks.

43. The method of claim 39, wherein said library system further includes a plurality of drives for at least reading information from said units, and wherein said method further comprises the steps of:
  verifying the physical presence of each of said drive in said library and storing an indication of the presence of said drives in a memory.

* * * * *